United States Patent
Hay et al.

(10) Patent No.: US 11,756,212 B1
(45) Date of Patent: *Sep. 12, 2023

(54) ENHANCED ANALYSIS TECHNIQUES USING COMPOSITE FREQUENCY SPECTRUM DATA

(71) Applicant: RDI TECHNOLOGIES, INC., Knoxville, TN (US)

(72) Inventors: Jeffrey R. Hay, Prospect, KY (US); Mark William Slemp, Tellico Plains, TN (US); Kenneth Ralph Piety, Knoxville, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,529

(22) Filed: Mar. 18, 2022

Related U.S. Application Data

(63) Continuation of application No. 17/356,617, filed on Jun. 24, 2021, now Pat. No. 11,282,213.

(60) Provisional application No. 63/043,299, filed on Jun. 24, 2020.

(51) Int. Cl.
 *G06T 7/246* (2017.01)
 *G06T 7/90* (2017.01)
 *G06F 3/04847* (2022.01)
 *G06T 11/00* (2006.01)

(52) U.S. Cl.
 CPC .......... *G06T 7/246* (2017.01); *G06F 3/04847* (2013.01); *G06T 7/90* (2017.01); *G06T 11/00* (2013.01); *G06T 2200/24* (2013.01); *G06T 2207/10016* (2013.01); *G06T 2207/10024* (2013.01); *G06T 2207/20092* (2013.01)

(58) Field of Classification Search
 None
 See application file for complete search history.

(56) References Cited

U.S. PATENT DOCUMENTS

| | | | |
|---|---|---|---|
| 5,517,251 A | 5/1996 | Rector et al. | |
| 5,666,157 A | 9/1997 | Aviv | |
| 5,680,025 A * | 10/1997 | Bowers, III | G01R 31/343 318/806 |
| 6,028,626 A | 2/2000 | Aviv | |

(Continued)

OTHER PUBLICATIONS

Rubinstein et al. ("Revealing Invisible Changes in the World (YouTube)", YouTube https://www.youtube.com/watch?v=e9ASH8IBJ2U, 2012.

(Continued)

*Primary Examiner* — Heather R Jones
(74) *Attorney, Agent, or Firm* — Wyatt, Tarrant & Combs, LLP; Stephen C. Hall

(57) ABSTRACT

Systems and methods are provided to evaluate moving objects undergoing periodic motion through the screening of a video recording of such objects in motion for frequency peaks in the spectral data, and to determine spatially where these frequencies occur in the scene depicted in the video recording, wherein a frequency spectrum is created for a subset of pixels or virtual pixels and a composite frequency spectrum table or graph is constructed of frequencies that are selected from among the larger group of frequencies represented by the frequency peaks of the spectral data.

1 Claim, 18 Drawing Sheets
(11 of 18 Drawing Sheet(s) Filed in Color)

(56) References Cited

U.S. PATENT DOCUMENTS

| | | |
|---|---|---|
| 6,295,383 B1 | 9/2001 | Smitt et al. |
| 6,422,741 B2 | 7/2002 | Murphy et al. |
| 6,456,296 B1 | 9/2002 | Cataudella et al. |
| 6,549,869 B1 * | 4/2003 | Piety .................. G01H 1/003 702/56 |
| 6,727,725 B2 | 4/2004 | Devaney et al. |
| 6,774,601 B2 | 8/2004 | Schwartz et al. |
| 6,792,811 B2 | 9/2004 | Argento et al. |
| 7,622,715 B2 | 11/2009 | Ignatowicz |
| 7,672,369 B2 | 3/2010 | Garakani et al. |
| 7,710,280 B2 | 5/2010 | McLellan |
| 7,862,188 B2 | 1/2011 | Luty et al. |
| 7,903,156 B2 | 3/2011 | Nobori et al. |
| 8,119,986 B1 | 2/2012 | Garvey, III et al. |
| 8,149,273 B2 | 4/2012 | Liu et al. |
| 8,170,109 B2 | 5/2012 | Gaude et al. |
| 8,242,445 B1 | 8/2012 | Scanion et al. |
| 8,351,571 B2 | 1/2013 | Brinks et al. |
| 8,374,498 B2 | 2/2013 | Pastore |
| 8,475,390 B2 | 7/2013 | Heaton et al. |
| 8,483,456 B2 | 7/2013 | Nagatsuka et al. |
| 8,502,821 B2 | 8/2013 | Louise et al. |
| 8,515,711 B2 | 8/2013 | Mitchell et al. |
| 8,523,674 B2 | 9/2013 | Patti |
| 8,537,203 B2 | 9/2013 | Seibel et al. |
| 8,693,735 B2 | 4/2014 | Keilkopf et al. |
| 8,720,781 B2 | 5/2014 | Wang et al. |
| 8,731,241 B2 | 5/2014 | Johnson et al. |
| 8,765,121 B2 | 7/2014 | Maslowski et al. |
| 8,774,280 B2 | 7/2014 | Tourapis et al. |
| 8,797,439 B1 | 8/2014 | Coley et al. |
| 8,803,977 B2 | 8/2014 | Uchima et al. |
| 8,811,708 B2 | 8/2014 | Fischer et al. |
| 8,823,813 B2 | 9/2014 | Manzel et al. |
| 8,831,370 B2 | 9/2014 | Archer |
| 8,874,374 B2 | 10/2014 | Bogucki |
| 8,879,789 B1 | 11/2014 | Figov et al. |
| 8,879,894 B2 | 11/2014 | Neuman et al. |
| 8,884,741 B2 | 11/2014 | Cavallaro et al. |
| 8,897,491 B2 | 11/2014 | Ambrus et al. |
| 8,924,163 B2 | 12/2014 | Hudson et al. |
| 9,006,617 B2 | 4/2015 | Mullen |
| 9,075,136 B1 | 7/2015 | Joao |
| 9,805,475 B2 | 10/2017 | Rubinstein et al. |
| 10,762,639 B1 * | 9/2020 | Hay .................. G06T 3/4053 |
| 11,100,654 B1 * | 8/2021 | Piety .................. G06T 7/001 |
| 2004/0032924 A1 | 2/2004 | Judge, Jr. |
| 2004/0081369 A1 | 4/2004 | Gindele et al. |
| 2004/0160336 A1 | 8/2004 | Hoch et al. |
| 2004/0184529 A1 | 9/2004 | Henocq et al. |
| 2006/0009700 A1 | 1/2006 | Brumfield et al. |
| 2006/0049707 A1 | 3/2006 | Vuyyuru |
| 2006/0147116 A1 | 7/2006 | Le Clerc |
| 2006/0251170 A1 | 11/2006 | Ali |
| 2007/0061043 A1 | 3/2007 | Ermakov et al. |
| 2007/0276270 A1 | 11/2007 | Tran |
| 2009/0010570 A1 | 1/2009 | Yamada et al. |
| 2010/0033570 A1 | 2/2010 | Yokohata et al. |
| 2010/0042000 A1 | 2/2010 | Schuhrke et al. |
| 2010/0091181 A1 | 4/2010 | Capps |
| 2010/0110100 A1 | 5/2010 | Anandasivam et al. |
| 2010/0324423 A1 | 12/2010 | El-Aklouk et al. |
| 2010/0328352 A1 | 12/2010 | Shamir et al. |
| 2011/0019027 A1 | 1/2011 | Fujita et al. |
| 2011/0152729 A1 | 6/2011 | Oohashi et al. |
| 2012/0207218 A1 | 3/2012 | Asamura et al. |
| 2013/0060571 A1 | 3/2013 | Soemo et al. |
| 2013/0175424 A1 | 7/2013 | Weil |
| 2013/0201316 A1 | 8/2013 | Binder et al. |
| 2013/0342691 A1 | 12/2013 | Lewis et al. |
| 2014/0002667 A1 | 1/2014 | Cheben et al. |
| 2014/0072190 A1 | 3/2014 | Wu et al. |
| 2014/0072228 A1 | 3/2014 | Rubinstein et al. |
| 2014/0072229 A1 | 3/2014 | Wadhwa et al. |
| 2014/0112537 A1 | 4/2014 | Frank et al. |
| 2014/0169763 A1 | 6/2014 | Nayak et al. |
| 2014/0205175 A1 | 7/2014 | Tanaka et al. |
| 2014/0236036 A1 | 8/2014 | de Haan et al. |
| 2014/0341470 A1 | 11/2014 | Lee et al. |
| 2014/0368528 A1 | 12/2014 | Konnola et al. |
| 2015/0134545 A1 | 5/2015 | Mann et al. |
| 2015/0221534 A1 | 8/2015 | van der Meulen |
| 2016/0171309 A1 * | 6/2016 | Hay .................. A61B 5/0077 348/143 |
| 2016/0217587 A1 | 7/2016 | Hay |
| 2016/0217588 A1 | 7/2016 | Hay |
| 2016/0232686 A1 | 8/2016 | Park et al. |
| 2016/0300341 A1 * | 10/2016 | Hay .................. G06F 16/7335 |
| 2017/0000356 A1 | 1/2017 | Smith, Sr. |
| 2017/0000392 A1 | 1/2017 | Smith |
| 2017/0119258 A1 | 5/2017 | Kolanko |
| 2017/0135628 A1 | 5/2017 | Singer |
| 2017/0221216 A1 * | 8/2017 | Chen .................. G06T 7/246 |
| 2018/0061083 A1 | 3/2018 | Buyukozturk et al. |
| 2018/0177464 A1 | 6/2018 | DeBusschere et al. |
| 2018/0225803 A1 | 8/2018 | Elgharib et al. |
| 2018/0276823 A1 | 9/2018 | Barral et al. |
| 2018/0296075 A1 | 10/2018 | Meglan et al. |
| 2018/0335366 A1 * | 11/2018 | Qiao .................. G01M 13/045 |
| 2019/0236068 A1 | 8/2019 | Stark et al. |
| 2020/0029891 A1 | 1/2020 | Swisher |
| 2020/0065957 A1 * | 2/2020 | Hay .................. G06T 7/0004 |

OTHER PUBLICATIONS

Hay, J.R. "High Dynamic Range Imaging for the Detection of Motion" pp. 18-141; dissertation University of Louisville (Kentucky); May 2011.

Liu et al., "Motion magnification", ACM Transactions on Graphics (TOG)—Proceedings of ACM SIGGRAPH 2005 TOG Homepage. vol. 24 Issue 3, Jul. 2005.

Mazen, et al.; A vision-based approach for the direct measurement of displacements in vibrating systems; article from Smart Materials and Structures; 2003; 12; pp. 735-794; IOP Publishing LTD; UK.

Meyer S., Sorkine-Hornung A., Gross M. (2916) Phase-Based Modification Transferror Video. In: Leibe 3., Matas J., Sebe N., Welling M. (eds) Computer Vision—ECCV 2016. ECCV 201 6. Lecture Notes in Computer Science, vol. 9907. Springer. Cham. (Year: 2016).

Miyatake K, Yamagishi M, Tanaka N, Uematsu M, Yamazaki N, Mine Y, Sano A, Hirama M. New method for evaluating left ventrioular wall motion by color-coded tissue Doppler imaging: in vitro and in vivo studies. J Am Coll Cardiel. Mar. 1, 1995 :25(3):717-24 (Year: 1995).

Nobuo Yamazaki et al "Analysis of Ventricular Wall Motion Using Color-Coded Tissue Doppler Imaging System" 1994 Jpn. J. Appl. Phys. 33 3141 (Year: 1994).

\* cited by examiner

| Peak No. | Rank (Ampl) | Frequency (Hz) | Amplitude (Mils P-P) | Orders xRPM | Occurrence # Pixels |
|---|---|---|---|---|---|
| 1 | 3 | 3.56 | 1.236 | 0.122 | 21,894 |
| 2 | 1 | 5.12 | 3.127 | 0.175 | 4,432 |
| 3 | 6 | 8.95 | 0.587 | 0.307 | 2,298 |
| 4 | 7 | 16.43 | 0.467 | 0.563 | 1,741 |
| 5 | 2 | 29.20 | 2.432 | 1.000 | 218,408 |
| 6 | 15 | 43.19 | 0.067 | 1.479 | 159 |
| 7 | 10 | 58.40 | 0.110 | 2.000 | 197,398 |
| 8 | 14 | 60.01 | 0.074 | 2.055 | 898 |
| 9 | 4 | 65.06 | 1.122 | 2.228 | 23,097 |
| 10 | 9 | 71.58 | 0.160 | 2.451 | 5,739 |
| 11 | 17 | 87.60 | 0.021 | 3.000 | 152,312 |
| 12 | 12 | 89.22 | 0.006 | 3.055 | 274 |
| 13 | 16 | 96.42 | 0.033 | 3.302 | 541 |
| 14 | 8 | 101.56 | 0.259 | 3.478 | 3,592 |
| 15 | 19 | 116.80 | 0.006 | 4.000 | 196 |
| 16 | 11 | 120.03 | 0.106 | 4.111 | 40,563 |
| 17 | 18 | 145.99 | 0.009 | 5.000 | 188,588 |
| 18 | 12 | 209.25 | 0.082 | 7.166 | 407 |
| 19 | 13 | 210.87 | 0.079 | 7.222 | 1,394 |
| 20 | 5 | 240.07 | 0.659 | 8.222 | 6,890 |

FIGURE 12A

| Peak No. | Rank (Ampl) | Frequency (Hz) | Amplitude (Mils P-P) | Orders xRPM | Occurrence # Pixels |
|---|---|---|---|---|---|
| 2 | 1 | 5.12 | 3.127 | 0.175 | 4,432 |
| 5 | 2 | 29.20 | 2.432 | 1.000 | 218,408 |
| 1 | 3 | 3.56 | 1.236 | 0.122 | 21,894 |
| 9 | 4 | 65.06 | 1.122 | 2.228 | 23,097 |
| 20 | 5 | 240.07 | 0.659 | 8.222 | 6,890 |
| 3 | 6 | 8.95 | 0.587 | 0.307 | 2,298 |
| 4 | 7 | 16.43 | 0.467 | 0.563 | 1,741 |
| 14 | 8 | 101.56 | 0.259 | 3.478 | 3,592 |
| 10 | 9 | 71.58 | 0.160 | 2.451 | 5,739 |
| 7 | 10 | 58.40 | 0.110 | 2.000 | 197,398 |
| 16 | 11 | 120.03 | 0.106 | 4.111 | 40,563 |
| 12 | 12 | 89.22 | 0.006 | 3.055 | 274 |
| 18 | 12 | 209.25 | 0.082 | 7.166 | 407 |
| 19 | 13 | 210.87 | 0.079 | 7.222 | 1,394 |
| 8 | 14 | 60.01 | 0.074 | 2.055 | 898 |
| 6 | 15 | 43.19 | 0.067 | 1.479 | 159 |
| 13 | 16 | 96.42 | 0.033 | 3.302 | 541 |
| 11 | 17 | 87.60 | 0.021 | 3.000 | 152,312 |
| 17 | 18 | 145.99 | 0.009 | 5.000 | 188,588 |
| 15 | 19 | 116.80 | 0.006 | 4.000 | 196 |

FIGURE 12B

| Peak No. | Rank (Ampl) | Frequency (Hz) | Amplitude (Mils P-P) | Orders xRPM | Occurrence # Pixels |
|---|---|---|---|---|---|
| 5 | 2 | 29.20 | 2.432 | 1.000 | 218,408 |
| 7 | 10 | 58.40 | 0.110 | 2.000 | 197,398 |
| 11 | 17 | 87.60 | 0.021 | 3.000 | 152,312 |
| 17 | 18 | 145.99 | 0.009 | 5.000 | 188,588 |
| 16 | 11 | 120.03 | 0.106 | 4.111 | 40,563 |
| 9 | 4 | 65.06 | 1.122 | 2.228 | 23,097 |
| 1 | 3 | 3.56 | 1.236 | 0.122 | 21,894 |
| 20 | 5 | 240.07 | 0.659 | 8.222 | 6,890 |
| 10 | 9 | 71.58 | 0.160 | 2.451 | 5,739 |
| 2 | 1 | 5.12 | 3.127 | 0.175 | 4,432 |
| 14 | 8 | 101.56 | 0.259 | 3.478 | 3,592 |
| 3 | 6 | 8.95 | 0.587 | 0.307 | 2,298 |
| 4 | 7 | 16.43 | 0.467 | 0.563 | 1,741 |
| 19 | 13 | 210.87 | 0.079 | 7.222 | 1,394 |
| 8 | 14 | 60.01 | 0.074 | 2.055 | 898 |
| 13 | 16 | 96.42 | 0.033 | 3.302 | 541 |
| 18 | 12 | 209.25 | 0.082 | 7.166 | 407 |
| 12 | 12 | 89.22 | 0.006 | 3.055 | 274 |
| 15 | 19 | 116.80 | 0.006 | 4.000 | 196 |
| 6 | 15 | 43.19 | 0.067 | 1.479 | 159 |

FIGURE 12C

ENHANCED ANALYSIS TECHNIQUES USING COMPOSITE FREQUENCY SPECTRUM DATA

CROSS REFERENCE TO RELATED APPLICATIONS

This application claims the benefit of and priority to U.S. patent application Ser. No. 17/356,617, titled "Enhanced analysis techniques using composite frequency spectrum data" filed Jun. 24, 2021, now patented as U.S. Pat. No. 11,282,213, and naming at least one of the present inventors, which claimed benefit of and priority to U.S. Patent Application Ser. No. 63/043,299, which was filed on Jun. 24, 2020 and named at least one of the present inventors, the contents of all of which are fully incorporated herein by reference.

BACKGROUND

The measurement of dynamic motion from civil structures, machines, and living beings using video recordings from cameras has gained wide acceptance since 2010. The camera offers the advantages of being a non-contact sensor and provides information from millions of pixels simultaneously. The light intensity measured at each pixel is a result of the light reflected from the objects in the field of view in the visible light range or radiation emitted from the objects due to temperature in the infrared portion of the electromagnetic spectrum. Other regions in the electromagnetic energy spectrum may provide measurements related to other characteristics of the objects in the field of view. In the visible light range changes of the light intensity can be related to the motion of objects in the field of view. In some cases, a fundamental unit of measurement is displacement and the available accuracy achieved using video recordings is a tenth of a mil or better. The application of mathematical techniques to magnify the motion and the ability to modify the frame rate on replay of the recorded video allows technicians to visually present the motion of concern and provides powerful arguments about what is happening and the need for repair to decision-makers who may have limited technical understanding of the underlying physics of the fault condition.

Prior to the use of video measurements of motion, the common practice was to use sensors such as accelerometers or proximity probes to measure the motion at each point of interest. Frequently, when monitoring a machine such as a motor-pump combination, a technician might measure the motion in all three axes, horizontal, vertical, and axial directions, at each bearing housing. This process would yield a set of twelve measurements, on a four-bearing machine during a routine vibration check. When troubleshooting, a more extensive set of readings might be collected at other positions on the machine train or its supporting structure or foundation. This data is typically analyzed by reviewing the time waveform data and the frequency spectrum at each of the positions and axes at which data is collected.

This technique of individually comparing dynamic data at each location of interest with other locations or historical data is tedious and requires a good deal of expertise which is usually acquired over a period of years. This approach is manageable when the number of readings is limited, for example less than 30 measurements. However, dynamic measurements using a camera often produces data from millions of pixels. This makes the method of manually comparing readings at each pixel or even a set of composite pixels challenging or impractical. Although some pixels may not provide useful or meaningful information, there is the need to identify a workable technique to accelerate the ability of the analyst to efficiently screen the data from millions of pixels and quickly determine what are the significant frequencies of interest and where are they present spatially on the recorded images. Video measurement systems, such as the IRIS® MOTION AMPLIFICATION® System (RDI Technologies Inc. (Knoxville, Tenn.), allow the user to identify a region of interest, ROI, using a graphical user interface. Both in these systems and in the present embodiments, an ROI can be considered as a user-selected portion of a field of view in a video recording. With regard to prior video measurements systems such as those mentioned, the system software calculates the dominant motion in the ROI and presents time waveform graphs with a cursor synchronized to the frames of the video as well as frequency spectra of the motion. This approach is quite useful when studying the behavior at known points of interest; however, a different method is desirable when screening a complex scene with many elements in motion exhibiting multiple frequency components.

SUMMARY

There is a need to be able to efficiently screen a video for the frequencies of the peaks in the spectral data and to determine spatially where these frequencies occur in the scene captured by the camera. The identification of significant frequencies and their location in the image can be facilitated by constructing a composite frequency spectrum graph or table which combine the data from all pixels weighted in any number of ways to capture all significant frequencies in a single plot or table which is constructed from a matrix of frequency spectra or peak lists measured at each pixel in the recorded images. This provides the analyst a single graph or table that shows all the significant frequencies in the scene. A graphical user interface allows the analyst to optionally select a frequency peak in this graph or table and the window containing the video interactively applies a color map that highlights where the largest overall motion or the largest motion of the selected frequency appears in the scene. The colorized map applied to the video can overlay a filtered video with enhanced visualization of the vibration such as, but not limited to, amplification of motion in the recording. The colorization can use a single color or multi-color scheme to indicate where the largest amplitude of this frequency occurs spatially in the scene.

The composite frequency spectrum graph or table can be constructed using any number of methods. The first step involves creating the time waveform of the intensity changes at each pixel and then calculating the FFT of each waveform to produce a frequency spectrum that identifies the frequency, amplitude, and phase values at uniformly spaced frequency positions from zero frequency to a maximum frequency. The locations of peaks in the FFT frequency spectrum identify the frequencies with the larger amplitudes for each pixel in the field of view. The entire frequency spectrum of each pixel or the set of amplitude, frequency, and phase values at the larger peaks in the spectrum saved for each pixel provide the basic data from which the composite spectrum graph or table is constructed. A variety of techniques can be used to form the composite spectrum data, including linear averaging or peak hold averaging, or other selective averaging techniques which compile a set of peak frequencies based on both amplitude and frequency of occurrence spatially in the video. The averaging method employed can be applied to each line in the frequency spectrum of the individual pixels or only to peaks identified in the spectrum, or to only peaks with larger amplitudes or a having a higher occurrence count, i.e., a higher frequency of occurrence. For example, if only frequencies that occur at least 50 times are to be used in executing the steps on a particular video recording, this would be referred to as an occurrence threshold of 50. The exact method for constructing the composite frequency spectrum graph could be defined by a set of options specified by the user. Alternate embodiments may utilize a table of frequency peaks identified by the values of frequency, amplitude, and occurrence counts. A composite frequency spectrum graph could be constructed from this table of peak values, or a composite spectrum table could be used interactively to apply color mapping to the video, which are among the novel features described herein that are helpful toward viewing and assessing the motions of machines, parts, and components in complex arrangements. However, the objective will remain the same to present a single composite spectrum graph or table which highlights the significant frequencies present in the scene and a graphical user interface that facilitates visual identification in the field of view of where these frequencies occur spatially. Herein, the terms "composite spectrum" and "composite frequency spectrum" are interchangeable and mean the same.

BRIEF DESCRIPTION OF FIGURES

The patent or application file with respect to the present disclosure contains at least one drawing executed in color. Copies of this patent or patent application publication with color drawing(s) will be provided by the Office upon request and payment of the necessary fee.

The drawings, schematics, arrangements, figures, and descriptions contained in this application are to be understood as illustrative of steps, structures, features, and aspects of the present embodiments. Accordingly, the scope of embodiments is not limited to features, dimensions, scales, and arrangements shown in the figures.

FIG. 12A is a table of the largest 20 peaks compiled from all pixels in the field of view that have an occurrence count greater than 100 pixels arranged in ascending frequency order.

FIG. 12B is a table of the largest 20 peaks compiled from all pixels in the field of view that have an occurrence count greater than 100 pixels arranged in descending amplitude order.

FIG. 12C is a table of the largest 20 peaks compiled from all pixels in the field of view that have an occurrence count greater than 100 pixels arranged in descending order of pixel count.

MULTIPLE EMBODIMENTS AND ALTERNATIVES

Figure 1:
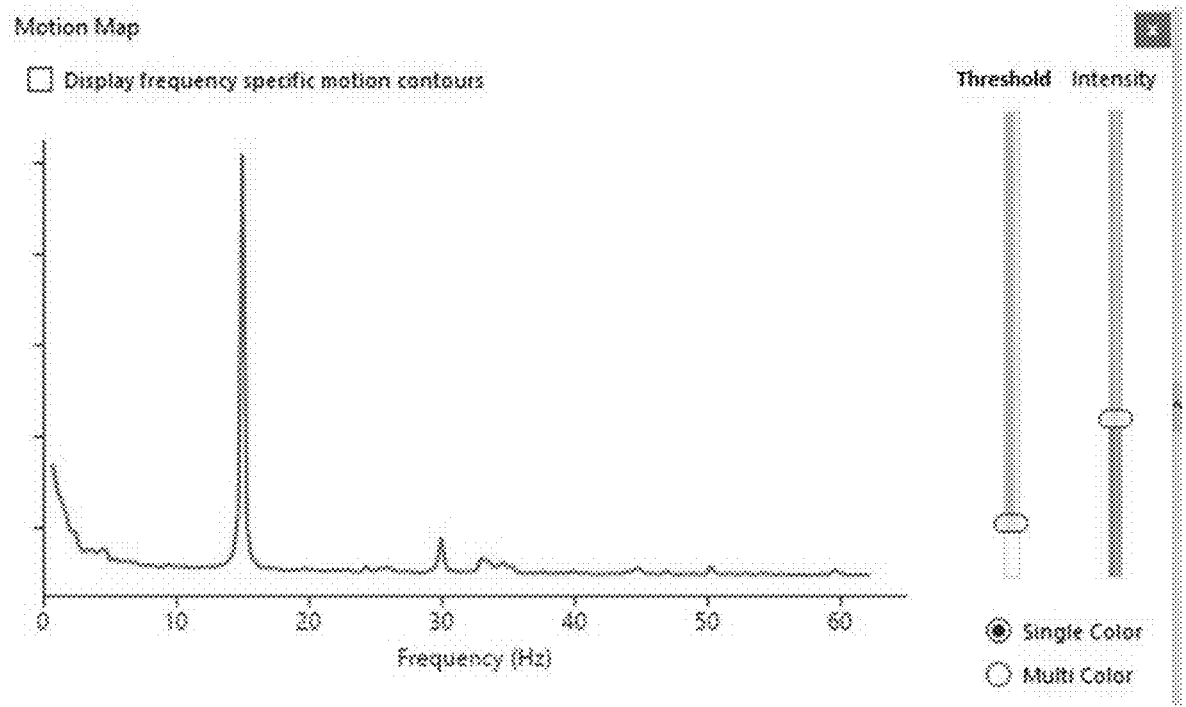
FIG. 1 is a composite frequency spectrum graph constructed by averaging each line in the frequency spectra from all pixels in the scene captured by the video.

In some embodiments within the scope of subject matter claimed herein, a system is provided for evaluating a moving object undergoing periodic motion. When sampled data is acquired, such as with a video acquisition device, the data may exist in a video recording having a plurality of video images of the moving object which are divisible into individual video image frames, and with each frame being divisible into a plurality of pixels. Such a system or method may comprise or utilize a processor and a memory for storage of the individual video image frames as well as any that are modified through the processes described herein, and a computer program operating in the processor, as well as one or more video acquisition devices. Embodiments are not limited to a particular type of video acquisition device, but may include one or more video cameras, webcams, or digital cameras integral in cells phones. A video acquisition device in the embodiments herein may be configured with an adjustable frame rate that allows the video images to be acquired at a sampling rate that is sufficient to capture a plurality of frequencies present in the periodic motion. That is, video images are acquired by a video acquisition device at a rate expressed in frames per second (fps), wherein for example at 120 fps there would be 1200 frames acquired in 10 sec. A computer program in the embodiments herein comprises computer-readable program instructions executed by the processor and may be configured to operate on a subset of pixels from the plurality of pixels in a field of view of the video recording. In some embodiments, the computer program operates to create a frequency spectrum for each pixel in the subset of pixels and to construct a composite frequency spectrum, or a table, presenting one or more prominent frequencies (e.g., based on a higher amplitude) from among the plurality of frequencies in the field of view. A selection of a specific frequency in the composite frequency spectrum graph or a table by the user will result in a spatially identifying where this motion is present spatially in the field of view. There is some flexibility in steps taken to construct the composite spectrum graph or table which will be described in the various embodiments presented herein. Other variations which result in a composite spectrum graph or table which is used to find the spatial location of specific frequencies would fall within the scope of this invention.

The construction of a composite frequency spectrum graph or table is based on identifying the frequencies with larger amplitudes resulting from motion at all the pixels in the recorded video. This information from millions of spatial locations is then intelligently reduced to a smaller set of values which highlight the significant frequencies of motion in the recording. The complete frequency spectrum or the set of larger peaks in the spectrum at each pixel is retained so that color maps can be applied to the video images to identify the spatial location of large amplitudes of overall motion or the location of specific frequencies of motion. The identification of motion at each pixel can be determined by constructing the waveform of the intensity changes at each pixel location and then calculating the frequency spectrum at each pixel, commonly accomplished using an FFT algorithm. The frequency spectrum provides the frequency, amplitude, and phase values at uniformly spaced frequency positions from zero frequency to a maximum frequency. The locations of peaks in the FFT frequency spectrum identify the frequencies with the larger amplitudes for each pixel in the field of view. The overall magnitude of the motion at each pixel can be calculated from the time waveform data or the FFT spectrum. In an alternate embodiment, the composite frequency spectrum could also be constructed from a grid of pixels (an area of contiguous pixels in the field of view as part of a defined section which may be rectangular) forming a less dense array of virtual pixels, or by tracking the motion of features in each section of the grid overlaying the field of view. This approach would produce waveform and spectrum data of the detected motion based for each section of the grid in both the x and y axes, as illustrated for the rectangular ROI in FIGS. 3A and 3B. The methods for construction of the composite frequency spectrum graph or table would remain the same, either all the spectra from both the x and y axes could be combined into a single composite frequency graph or table or alternatively a composite spectrum and table could be constructed for each axis. By way of non-limiting example, the locating of features, for example at the perimeter of a moving object, such as an edge, allows the system to perceive the effect of motion of the entire object. This could be a rocking motion of a motor, in which one side of the motor is displaced and a selected number of pixels working together as part of that feature are correlated in a manner to provide one way to perceive the object in motion.

The movement of such a feature, and thereby that position on the moving object, is associated with changes in location of the feature within the grid, for example moving through a rectangular section of the grid or from one rectangular section into another, as determined by techniques which are known in the art, such as optical flow algorithms that are well known to those skilled in the art. In one aspect, each section of the grid as a unique location of the field of view can be thought of as a virtual pixel. In some embodiments related to this aspect, the computer program operates on at least one feature of the moving object in the field of view by tracking movement of the at least one feature. The computer program then is able to produce a motion waveform and to calculate a frequency spectrum for the at least one feature, and it constructs a composite frequency spectrum presenting one or more selected frequencies from among the plurality of frequencies, in which a selection of frequencies is based on predetermined criteria, such as are described below in constructing a composite frequency spectrum graph or table. In other aspects, all the pixels in a section of the grid collectively are considered a virtual pixel, for example by taking an average of the frequencies and amplitudes determined for pixels within a grid section.

This set of frequency spectra from all spatial locations must be combined into a single graph or table which is presented to the user as a tool that he can use to select the frequencies of most interest to his investigation. The user may select either the overall amplitude and one of the significant frequencies in the field of view, and the system will use supporting spectral data particular to each spatial location determining how a color map is applied spatially to the video frames based on user specified options. For high resolution video images, this represents millions of individual frequency spectra. The amount of supporting information may be reduced by retaining only overall amplitude of motion and the amplitude, frequency, and phase values of the significant frequency peaks from each spectrum or by allowing the user to selectively limit the field of view for analysis. The current method for identifying spatially the location of large amplitude motion is to visually observe an amplified video and sequentially place ROIs at spatial locations where large amplitudes are observed or at locations of known interest such as a bearing housing. This tedious process will not show where the same frequency of motion is present spatially everywhere in the field of view. Also, the user may easily overlook possible frequencies of interest because he does not happen to put an ROI in one of the spatial locations where the frequency occurs. The new method described herein brings all significant frequencies into a single graph or table and highlights the spatial locations which exhibit this frequency in a novel manner that changes the efficiency and effectiveness of the investigative workflow followed by an analyst.

This method for identifying significant frequencies and their location in the image depends upon the construction of a composite spectral frequency graph or table which combines the data from all pixels weighted in any number of ways that capture all significant frequencies in a single plot or table. As described the graph or table is supported by a set of complete frequency spectra or list of peak values from each pixel or virtual pixel in the recorded images. Thus, when a specific frequency peak is selected from the graph or table, the software can quickly search the supporting data stored for each pixel to determine if this frequency is present at this pixel and if so, convert the amplitude to the appropriate color or to a single color to be assigned to this pixel or spatial location. The phase information could offer the ability to adapt the color map applied to the video by showing only spatial locations which share a specific phase relationship, such as in phase or out of phase at a selected frequency.

Figure 2:
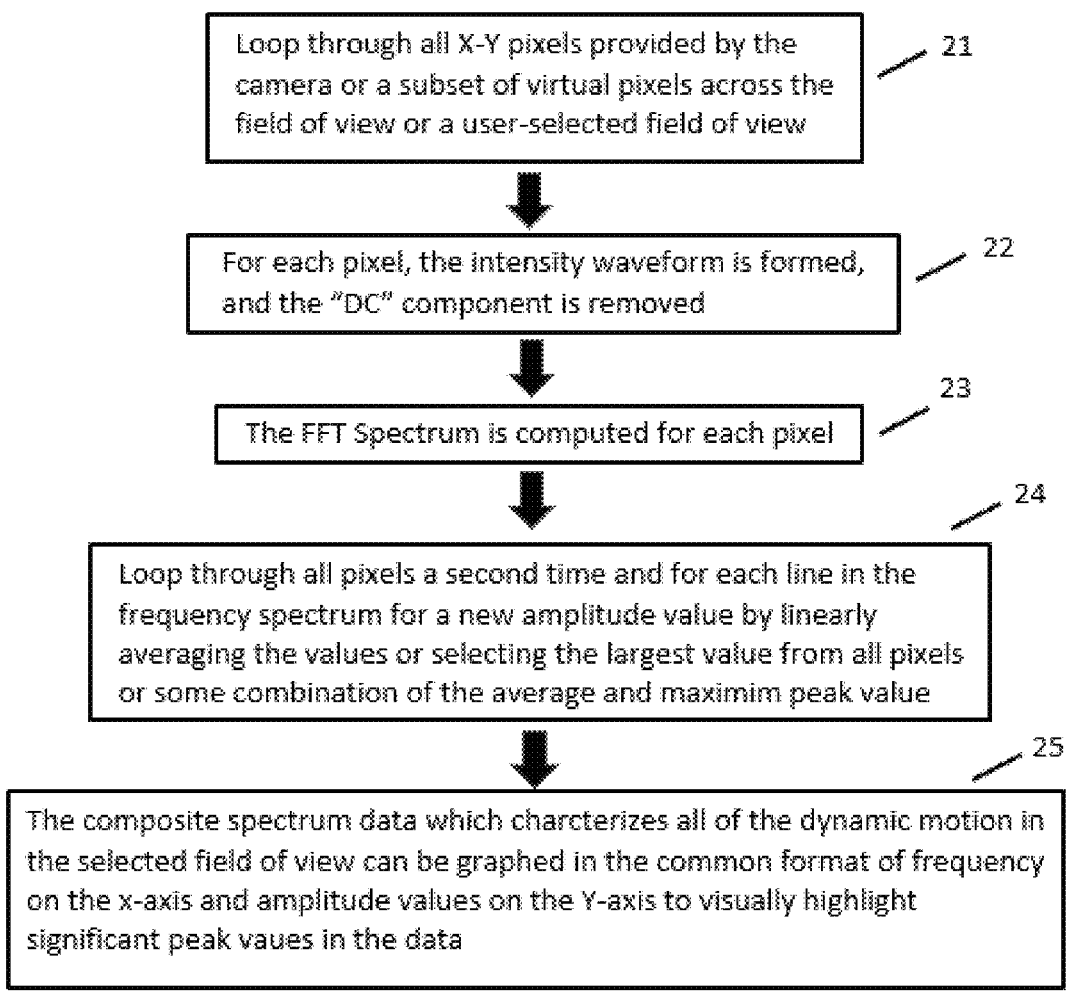
FIG. 2 is a flowchart of how the data in a composite spectrum graph is constructed.

The construction of the composite frequency spectrum graph or table represents an intelligent reduction of the information from potentially millions of spatial locations into a set of the most important frequency peaks of interest to the analyst. The simplest approach is to linearly average the amplitude values of the corresponding frequency line for the frequency spectra from all pixels in the entire field of view or a selected subset of the scene. This can be effective if there are only a few significant frequencies present and there is adequate separation between frequencies when multiple frequencies are present. FIG. 1 is a composite frequency spectrum graph constructed by averaging each line in the frequency spectra from all pixels in the scene captured by the video. This graph shows a single strong peak around 15 Hz. This amplitude of this peak is so large that it causes all the other peaks to appear very insignificant when presented on a linear scale. In order to effectively evaluate the smaller peaks, the data would need to be presented on a log scale or the user would need to zoom in around the lower peaks by expanding the Y-axis scale. However, as the number of frequencies present in the field of view increases or there is insufficient spacing between peaks in different pixels, then linear averaging at each frequency line in the spectrum may cause peaks to mask each other. Also, when using linear averaging on potentially millions of pixels, smaller peaks may be lost due to background noise present at these frequencies present in other pixels. In some embodiments, peak hold averaging may be preferred over a linear average. This technique retains the largest magnitude value which occurs at each line in the spectra from the individual pixels. FIG. 2 is a flowchart of how the data in a composite spectrum graph is constructed. At box (or step) 21, within a field of view (or user-selected portion of the field of view), the system loop through pixels, which can also be present as virtual pixels, provided by a camera in the x- and y-directions. An intensity waveform is produced for each pixel at box 22, and a FFT spectrum is computed for each at box 23. At box 24, a second loop through the pixels or virtual pixels occurs in which, for each line in the frequency spectrum, a new amplitude value is determined, for example by linear averaging, or by selecting the largest value from among the pixels, through a combination of averaging and maximum peak value, or other methods known in the art. At box 25, a composite frequency spectrum graph can be constructed, providing a characterization of all dynamic motion present in the field of view or selected portion, in a format of frequency on x-axis and amplitude values on y-axis, and thereby highlighting visually one or more significant peak values in the sampled data.

Figure 3A:
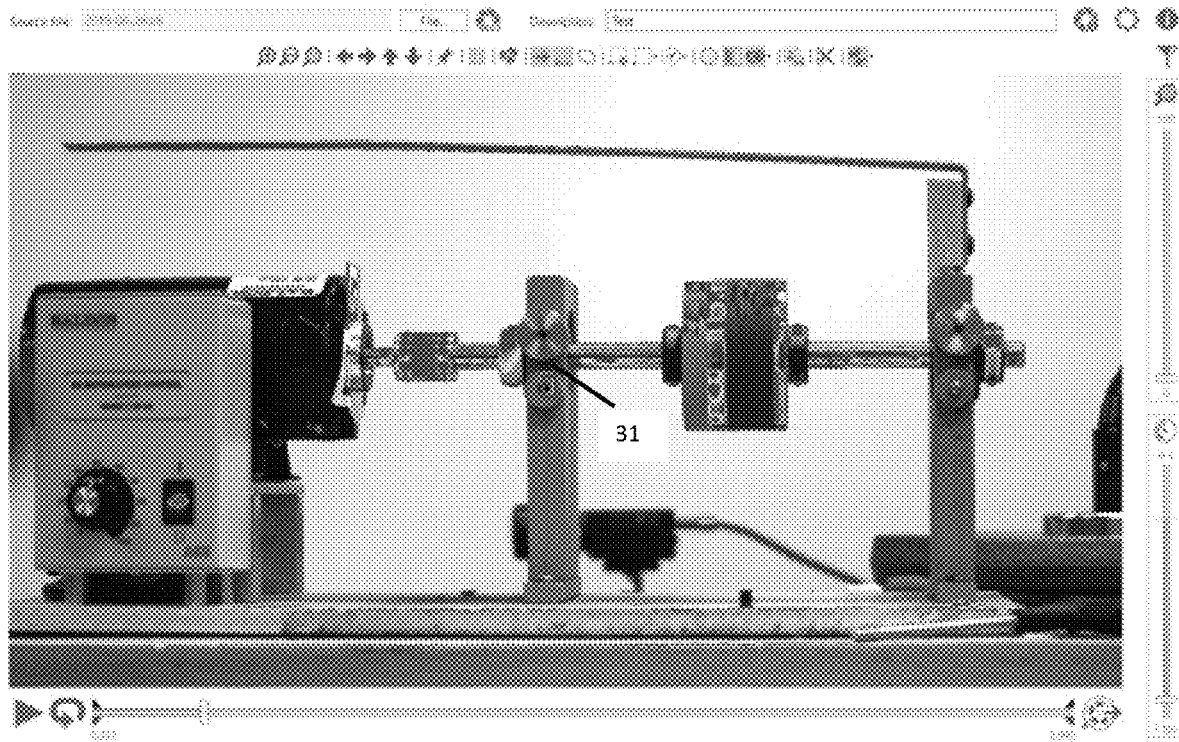
FIG. 3A shows the region of interest selected by the user and marked by the red rectangle on the still image of the rotor kit.
Figure 3B:
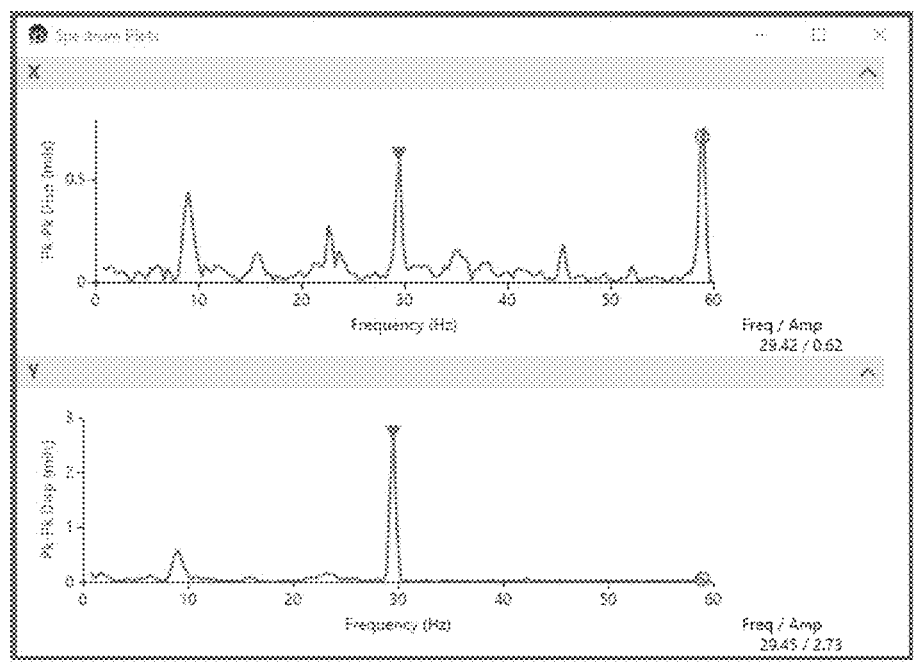
FIG. 3B illustrates the frequency spectra for the X and Y axes taken from the dominant motion detected in the region of interest marked by the red rectangle on the still image of the rotor kit.

FIG. 3A shows the ROI, item 31, selected by the user and marked by the red rectangle on the still image of the rotor kit. An exemplary video processing system which provides, among other features and capabilities, a user with an ability to draw a perimeter or region of interest within the video frame so that analysis may be focused on that region, is described in U.S. Pat. No. 10,459,615 titled "Apparatus and method for analyzing periodic motions in machinery" (Hay, Jeffrey R.; Oct. 29, 2019), the contents of which are fully incorporated by reference herein for all purposes. FIG. 3B illustrates the frequency spectra for the X and Y axes as measured in the directions orthogonal to the camera determined from tracking the motion of the dominant object detected in the ROI marked by the red rectangle on the still image of the rotor kit. This is one of the methods for investigating the frequency of the motion present in the video. A second or third ROI selected by the user would present the frequency measured at those locations. If detailed analytical information is desired at only a few locations, then this approach is sufficient for analysis. However, the analyst may miss important information because he fails to look at the region of the scene where it occurs. The application of a color map could be generated by identifying the frequency present in any selected ROI and requesting the system to calculate the spectra at all other spatial locations to identify where this frequency occurs in the scene; however the existence of frequencies not present in the ROIs selected by the analyst could easily be overlooked. This approach may be viewed as an alternate, but potentially less effective, embodiment that can highlight the spatial location of an identified frequency which still relies upon constructing frequency spectra for all spatial locations.

Figure 4A:
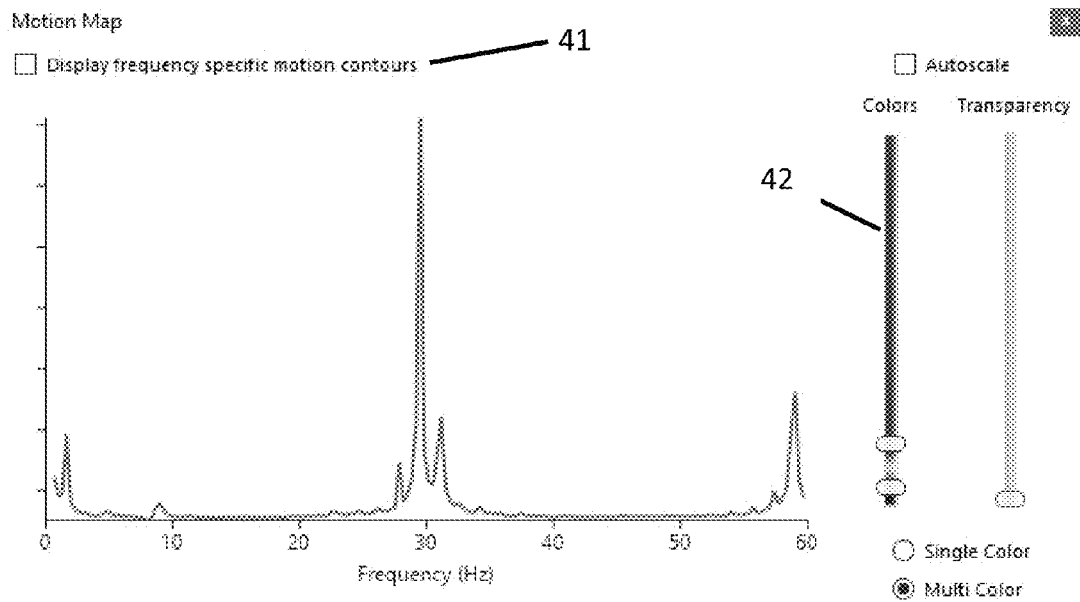
FIG. 4A shows the composite frequency spectrum graph constructed from the intensity changes at every pixel in the recorded video for the test rotor kit with options set for a multi-color map.
Figure 4B:
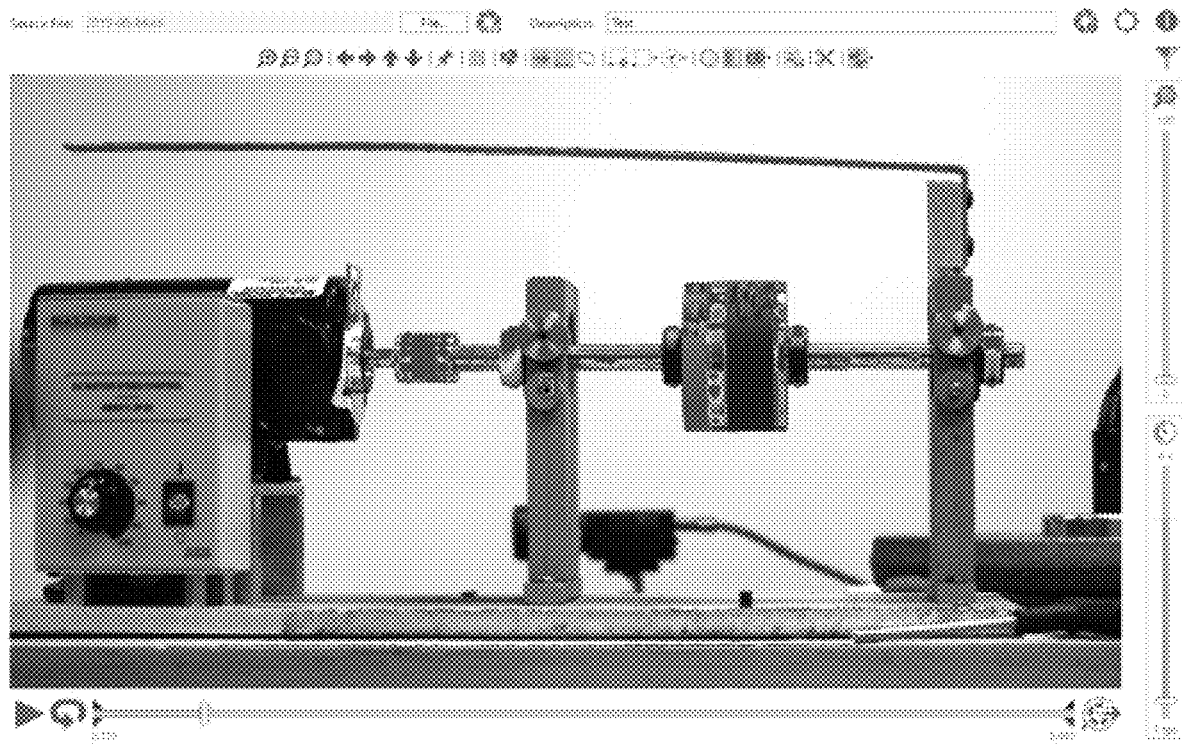
FIG. 4B provides the interactive multi-color map which highlights the largest magnitude intensity changes at every pixel in the recorded video for the test rotor kit.
Figure 5A:
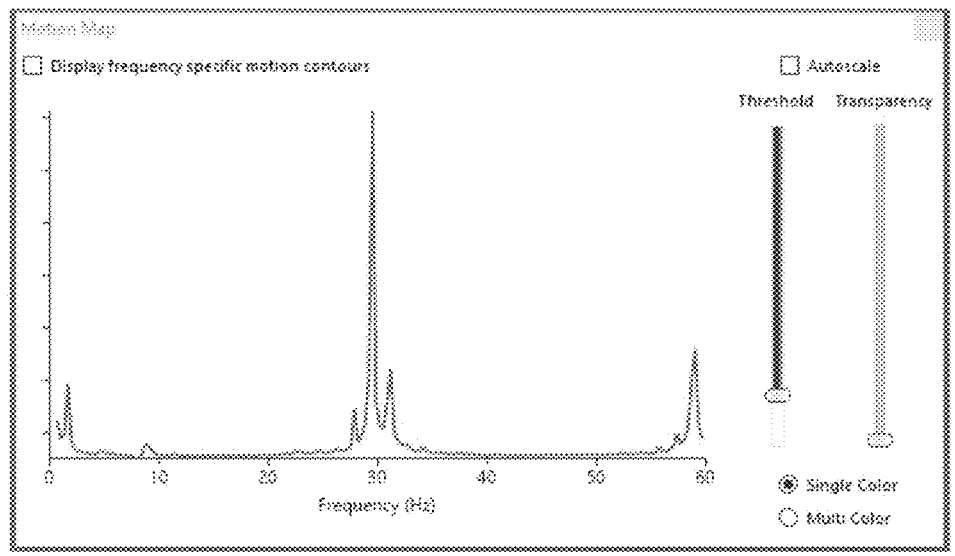
FIG. 5A shows the composite frequency spectrum graph constructed from the intensity changes at every pixel in the recorded video for the test rotor kit with options set for a single-color map.
Figure 5B:
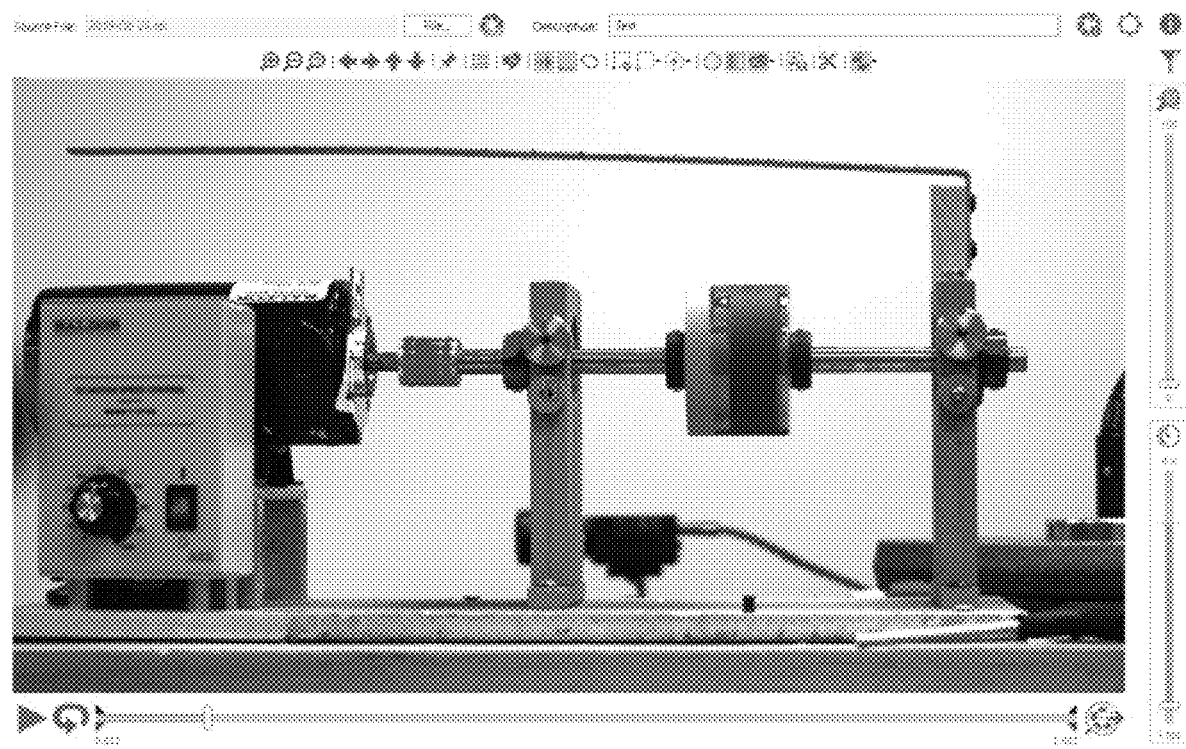
FIG. 5B shows the interactive single-color map which highlights the largest magnitude intensity changes at every pixel in the recorded video for the test rotor kit.

FIG. 4A shows the composite frequency spectrum graph constructed from the intensity changes at every pixel in the recorded video for the test rotor kit with options set for a multi-color map. Not all of the frequency peaks in the frequency spectra in FIG. 3B appear in the composite frequency spectrum graph which has been constructed by using a linear average of all pixels. FIG. 4B displays the interactive multi-color map which highlights the largest magnitude intensity changes at every pixel in the recorded video for the test rotor kit. This color mapping is applied to the overall motion rather than to any specific frequency because the user has not selected the option to "Display frequency specific motion contours," labelled as item 41. FIG. 5A shows the composite frequency spectrum graph constructed from the intensity changes at every pixel in the recorded video for the test rotor kit with options set for applying a single-color map. FIG. 5B displays the interactive single-color map which highlights the largest magnitude intensity changes at every pixel in the recorded video for the test rotor kit.

Figure 6:
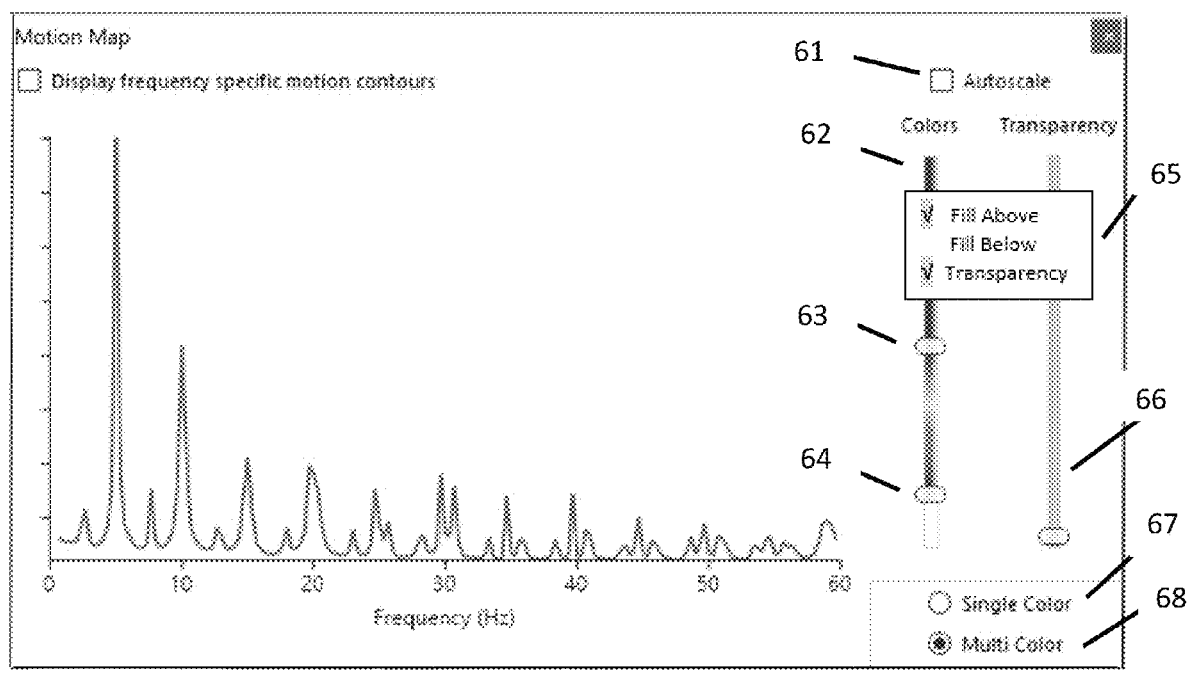
FIG. 6 presents the interactive options which may be specified by the user to adapt the color map applied to the video.

The application of a specific color map to the video frames is controlled by user-specified options as shown in FIG. 6. The user can specify a single color or multi-color map, items 67 and 68, respectively. Sliders on the color bar, item 62, to the right of the graph determine how the amplitude of the motion is scaled to a single color or multiple colors. An Autoscale option, item 61, will automatically scale the colors based on the population distribution of the amplitude range in the overall motion or the motion at the frequency selected for presentation. There is a popup option, item 65, that appears as a result of a right mouse click. The popup options allow the user to specify whether pixels with amplitude values above or below those represented at the upper and lower sliders, items 63 and 64 respectively, will be assigned a color or left black and white in the reconstructed video. If the user selects the Single Color map option, item 67, then a red color is applied at each pixel based on the amplitude range represented by the slider positions and the magnitude of the overall motion or the magnitude of a selected frequency for that pixel. The pixel is left with the original grayscale value if it does not meet the specified amplitude value. In this case, the red color is applied at all spatial locations with higher amplitudes of motion if Fill Above is specified and the red color is applied over a selected range of amplitudes if Fill Above is not selected. In a multi-color map, the color spectrum is mapped to a range of amplitude values with blue applied at lower amplitudes and red applied at larger magnitudes at each pixel or spatial location. In the multi-color case, when the Fill Above option is specified, the pixels with higher amplitude motion as determined by the upper slider will be given a red color. When the Fill Below is selected, then the pixels with lower amplitude values as determined by the lower slider will be assigned a blue color. Pixels with an amplitude of motion between that specified by the sliders will be assigned an appropriate color from the color spectrum. The transparency bar, item 66, when active will allow the user to set a value between 0 and 100. A transparency value of 0 will not show any of the grayscale images in the video and the entire scene will be filled with color based on the user selections. A transparency value of 100 will show only the original grayscale values of the pixels in the video. Intermediate values create a mix of the grayscale and color values.

Figure 7A:
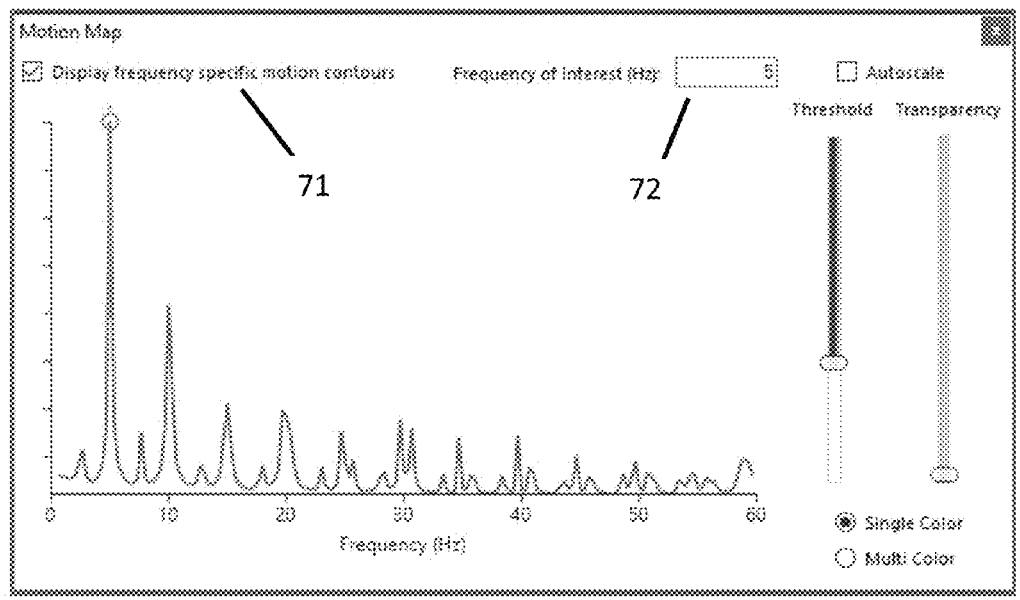
FIG. 7A shows the composite frequency spectrum graph constructed from the intensity changes at every pixel in the recorded video for this belt driven machine with options set for a single-color map and specific to motion at the selected frequency of 5 Hz.
Figure 7B:
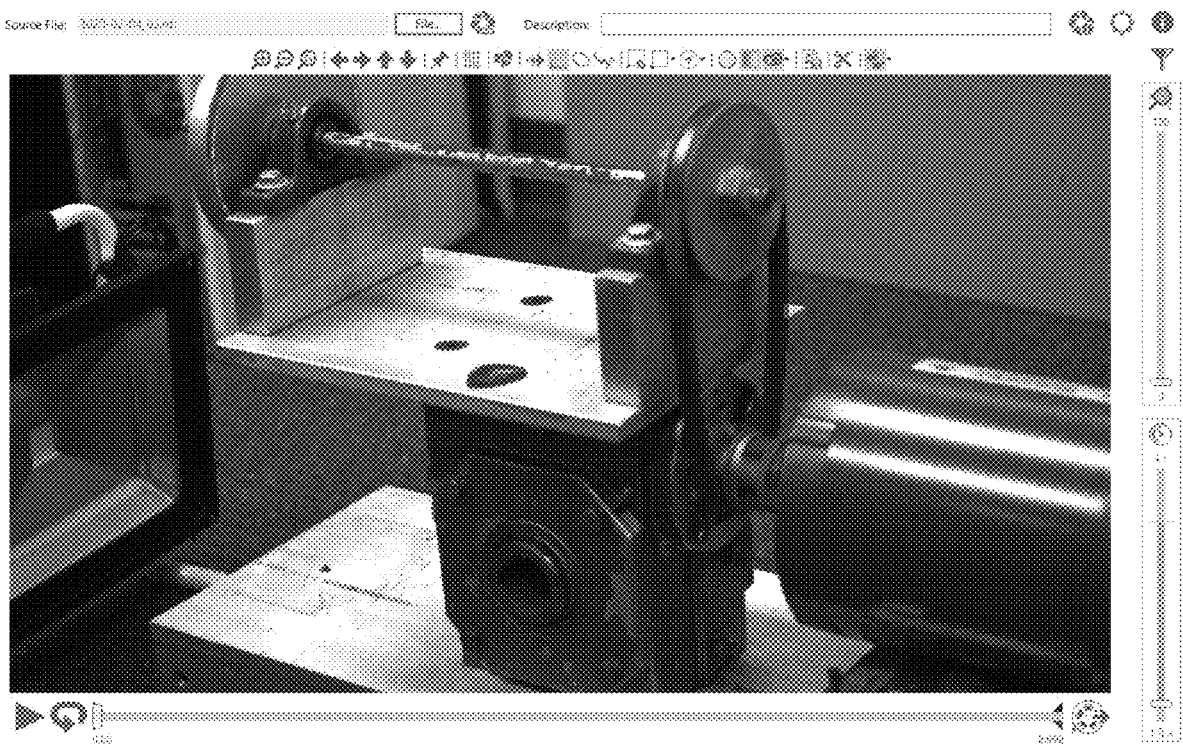
FIG. 7B shows the interactive multi-color map which highlights the largest magnitude intensity changes at every pixel in the recorded video for the belt-driven machine occurring at the frequency of 5 Hz which is the turning speed of the shaft.
Figure 8A:
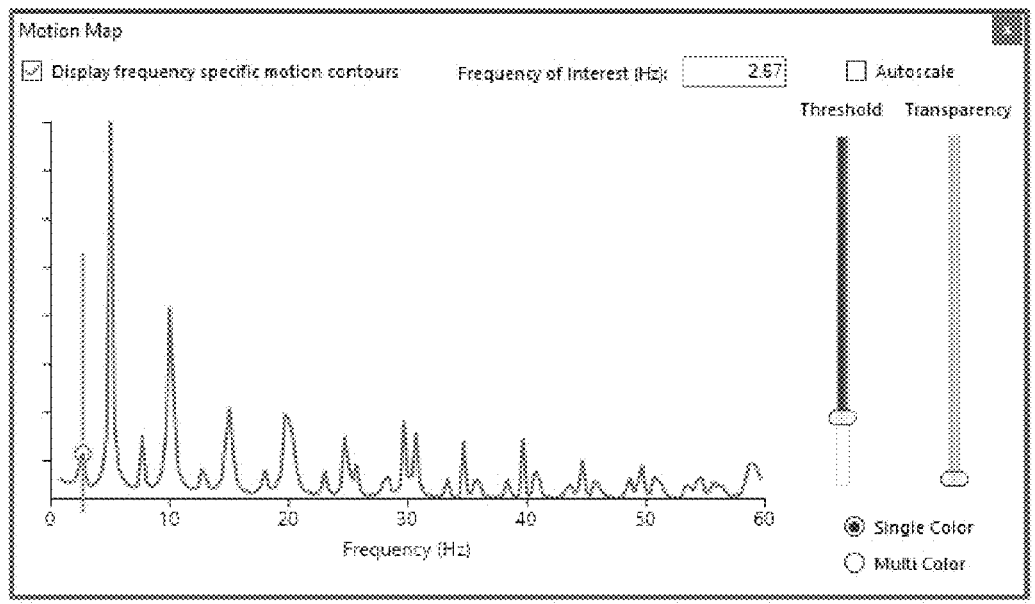
FIG. 8A shows the composite frequency spectrum graph constructed from the intensity changes at every pixel in the recorded video for this belt driven machine with options set for a single-color map and specific to motion at the selected frequency of 2.67 Hz.
Figure 8B:
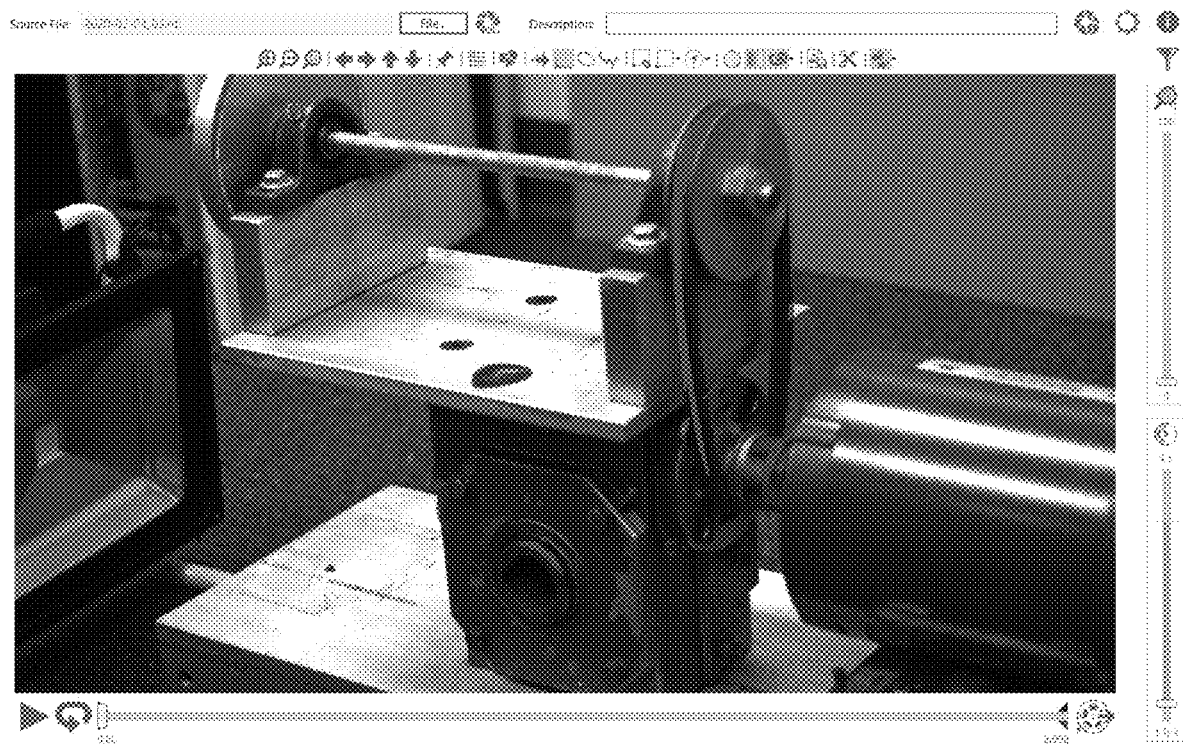
FIG. 8B shows the interactive multi-color map which highlights the largest magnitude intensity changes at every pixel in the recorded video for the belt-driven machine occurring at a known frequency which is the turning speed of the belt.

FIG. 7A shows the composite frequency spectrum graph constructed by linearly averaging the intensity changes at every pixel in the recorded video for this belt driven machine with options set for a single-color map and specific to motion, item 71, at the selected frequency of 5 Hz, item 72. FIG. 7B shows the interactive single-color map which highlights the largest magnitude intensity changes at every pixel in the recorded video for the belt-driven machine occurring at the frequency of 5 Hz which is the turning speed of the shaft. The color map clearly indicates the shaft that is moving at this frequency. FIG. 8A shows the composite frequency spectrum graph constructed by linearly averaging the intensity changes at every pixel in the recorded video for this belt driven machine with options set for a single-color map and specific to motion at the selected frequency of 2.67 Hz. FIG. 8B shows the interactive single-color map which highlights the largest magnitude intensity changes at every pixel in the recorded video for the belt-driven machine occurring at the frequency of 2.67 Hz which is the turning speed of the belt. The color map clearly indicates that the belt is moving at the 2.67 Hz frequency.

Figure 9A:
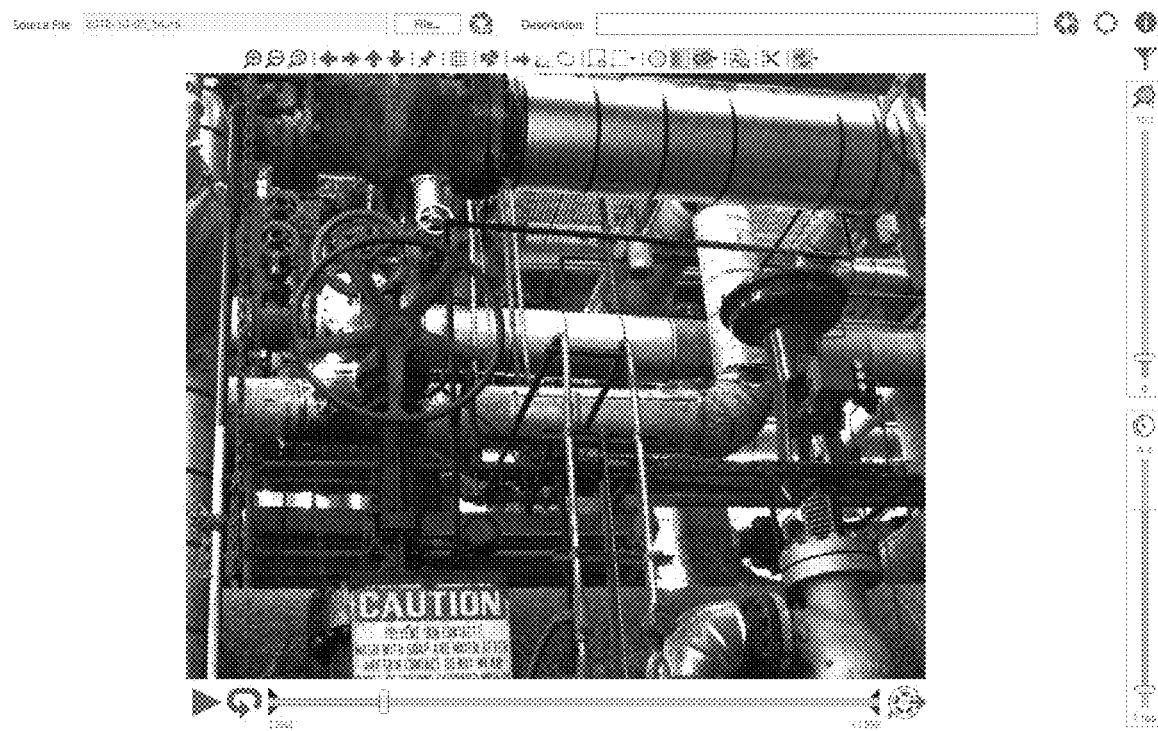
FIG. 9A shows the interactive multi-color map which highlights the largest magnitude intensity changes at every pixel in the recorded video for a complex arrangement of equipment.
Figure 9B:
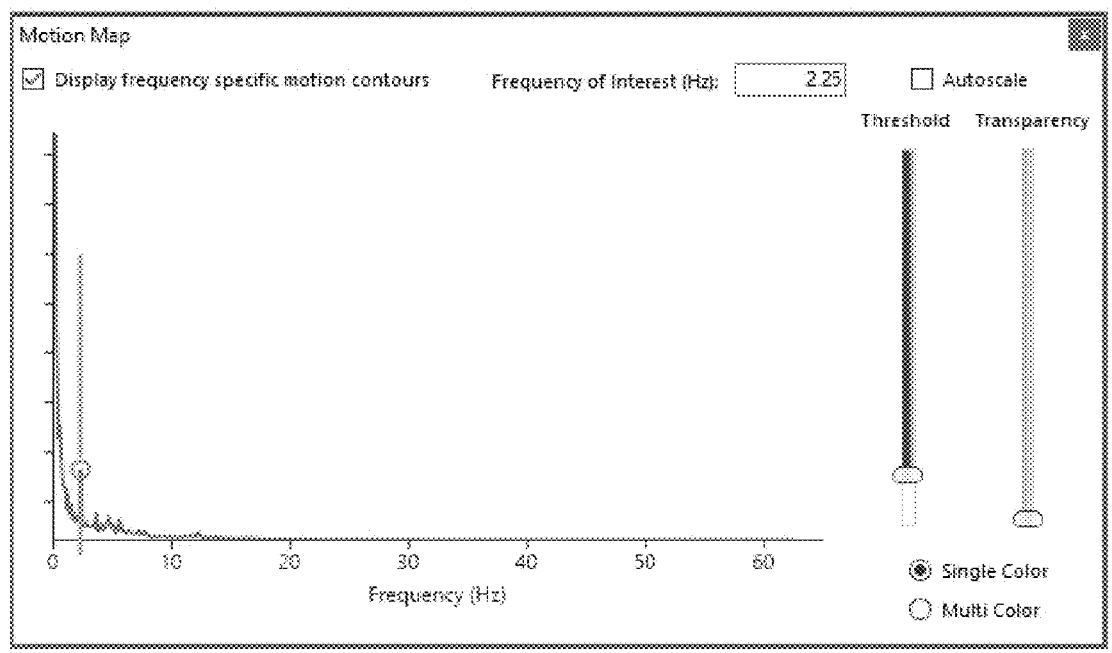
FIG. 9B shows the composite frequency spectrum graph constructed from the intensity changes at every pixel in the recorded video for this complex arrangement of equipment and documents that there is very little activity above 15 Hz and many closely spaced low frequency peaks.
Figure 9C:
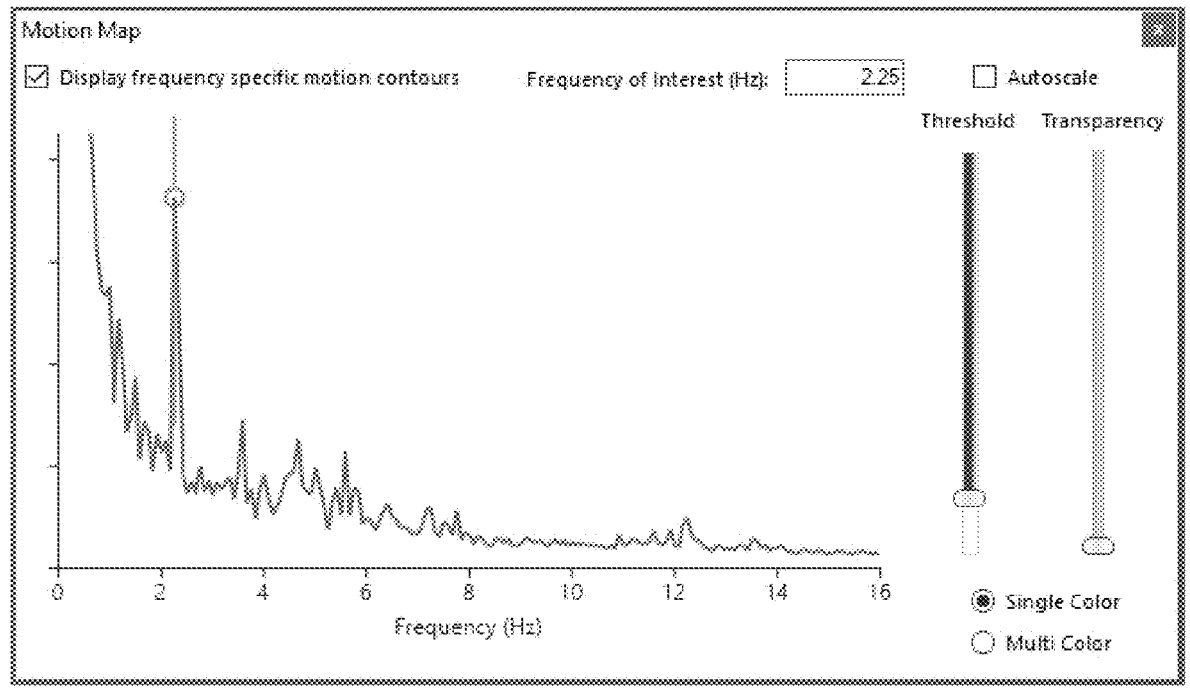
FIG. 9C shows an expanded view of the composite frequency spectrum graph and highlights the detail in peaks present below 15 Hz and separates the closely spaced, low frequency peaks.
Figure 9D:
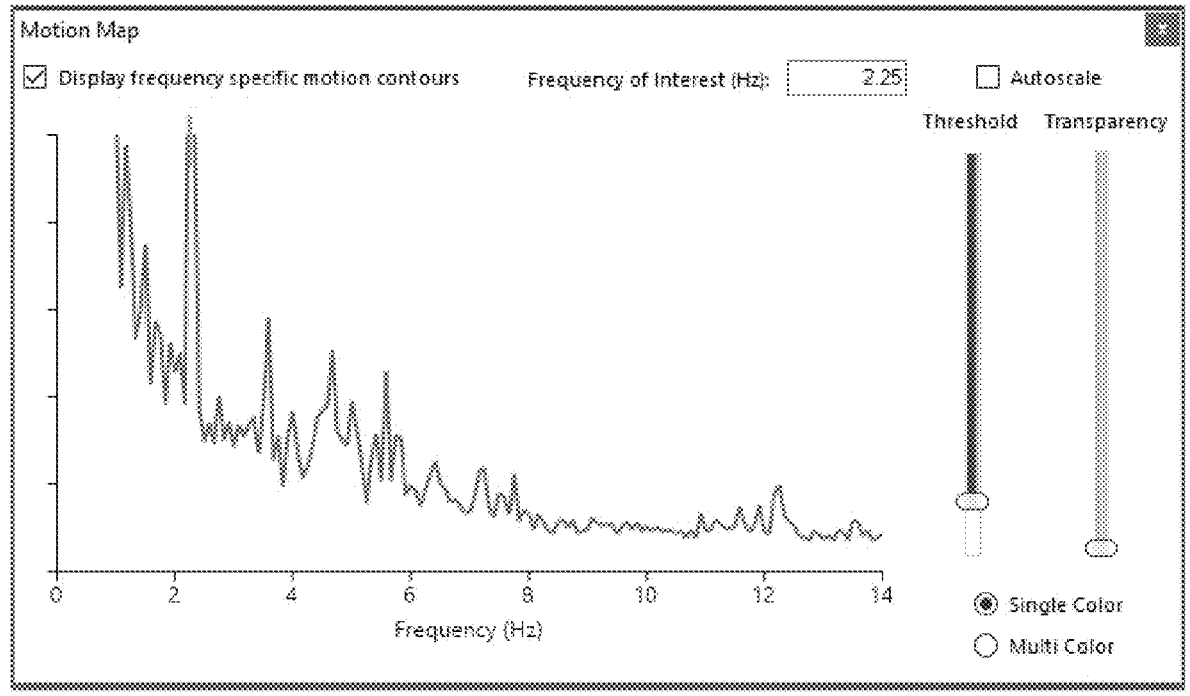
FIG. 9D shows an even further expanded view of the composite frequency spectrum graph and highlights the detail in peaks present below 15 Hz and separates the closely spaced, low frequency peaks.

FIG. 9A shows the interactive multi-color map which highlights the largest magnitude intensity changes at every pixel in the recorded video for a complex arrangement of equipment. FIG. 9B shows the composite frequency spectrum graph constructed by linearly averaging the intensity changes at every pixel in the recorded video for this complex arrangement of equipment and documents that there is very little activity above 15 Hz and many closely spaced low frequency peaks. FIG. 9C shows an expanded view of the composite frequency spectrum graph and highlights the detail in peaks present below 15 Hz and separates the closely spaced low frequency peaks. FIG. 9D shows an even further expanded view of the composite frequency spectrum graph and highlights the detail in peaks present below 15 Hz and separates the closely spaced, low frequency peaks.

The ability to use the composite frequency spectrum graph and interactively study the gross motion or to isolate the motion at a single frequency and visually locate the position where this occurs in the scene is a novel technique that enables the analyst to quickly review a video recording and focus his attention on the important spatial locations in the scene and identify all of the components moving at the same frequency. The ability to view single or multi-color color maps is typically a user preference and either map presents the same information. The threshold slider, item 42, shown in FIG. 4A and other figures, allows the user to select what amplitude of motion is represented in the colorization and provides instantaneous changes as the user moves the slider. The transparency option specifies how much of the image is visible behind the color map. The color map shown in the figures presented is superimposed over a single frame of the video. However, the color map will also remain during the video replay with or without amplification. This allows the user to visualize the motion in the presence of the color map to focus attention to the correct spatial location for the frequency of interest. In some embodiments, software providing machine-readable program instructions may be used to apply techniques such as MOTION AMPLIFICATION® for a better visualization of the rotating component. An exemplary system providing such capabilities is described in U.S. Pat. No. 10,062,411 titled "Apparatus and Method for Visualizing Periodic Motions in Mechanical Components" (Hay, Jeffrey R. et al.; Aug. 28, 2018), the contents of which are fully incorporated by reference herein for all purposes. Among other features and capabilities, this patent describes multiple embodiments in which a new image sequence or sequences are computed, showing the movements of an object(s) in motion being visually amplified, the contents of which are incorporated herein by reference in their entirety.

The video can also be filtered to a specific frequency such that only the motion at that frequency is present in the video. The ability to amplify the motion which has been filtered to a single frequency provides the analyst a unique ability to visualize a specific motion of concern and present this to interested stakeholders.

Other methods of constructing a composite frequency spectrum graph or table may be applied in alternate embodiments. The purpose of the composite frequency spectrum graph is to highlight the most significant frequencies present in the scene recorded by the video by increasing the prominence of motions associated with more significant frequencies compared to frequencies associated with more routine motions, such as baseline vibrations or noise. In this regard, in some embodiments criteria are predetermined and applied by the system to identify the most significant frequencies among those represented by frequency peaks in the composite frequency spectrum. Non-limiting examples of such criteria include those frequency peaks with the largest amplitudes or those which occur in a large number of spatial locations in the field of view being analyzed. Alternative methods described in this application represent other useful techniques for constructing the composite frequency spectrum graph or table. In addition to linearly averaging the spectra from all pixels, a peak hold summation can be used to improve the visualization of scenes with a complex set of frequencies present. Additionally, an alternate method that maintains excellent frequency resolution and identifies spatially meaningful frequencies with an occurrence counter can be accomplished by reducing the complete spectrum at every pixel location to a set of the largest N peaks defined by a precise frequency, amplitude and phase; and then create the composite frequency spectrum data by scanning the peak data stored for each pixel and retaining the largest M peaks which occur at a minimum number of pixels. The various embodiments for constructing the data needed to create a composite frequency spectrum or table described herein are illustrative and not intended to be limiting. Any number of variations could be devised by one skilled in the art to construct the data which characterize the set of significant frequencies in the video recording which accomplish the intended purpose of providing the analyst a straightforward method for identifying these frequencies spatially in the recorded scene and would fall within the scope of this invention.

A composite frequency spectrum graph from a video recording may be composed from 1 to 12 million pixels or more depending on the camera used to acquire the video. A straight linear average of several million values can easily obscure peaks which occur in a small subset of the scene. It has been observed in some data sets that this approach frequently results in a large value at the lowest frequency in the spectra with a descending slope as the frequency increases as seen in FIG. 9B. On other occasions, a single peak is dominant and most of the other peaks are barely visible above the floor noise in the spectrum as seen in FIG. 1. High floor noise in the frequency spectra of pixels which do not contain the frequency of interest can contribute to masking peaks in composite frequency spectrum graph. A linear scale is not optimum in this situation. The presence of the smaller peaks would be more apparent using a log amplitude scale. Alternatively, the user may elect to use the zoom features of the graphical interface to select the smaller peaks which are barely visible over the floor of the composite frequency spectrum graph as illustrated in FIGS. 9C and 9D.

Figure 10A:
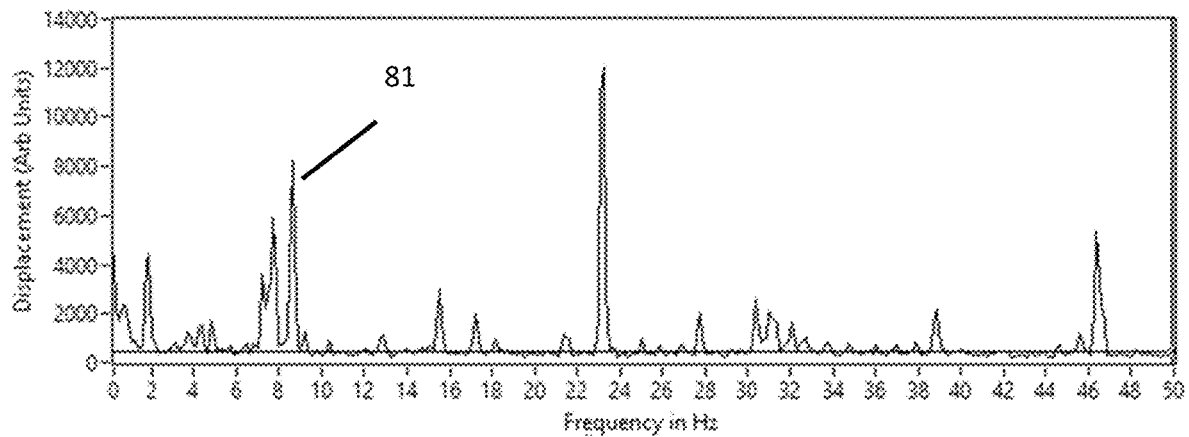
FIG. 10A is a composite frequency spectrum graph constructed using the peak hold technique that captures the largest amplitude value at each frequency in the spectrum from all the pixels in the field of view.
Figure 10B:
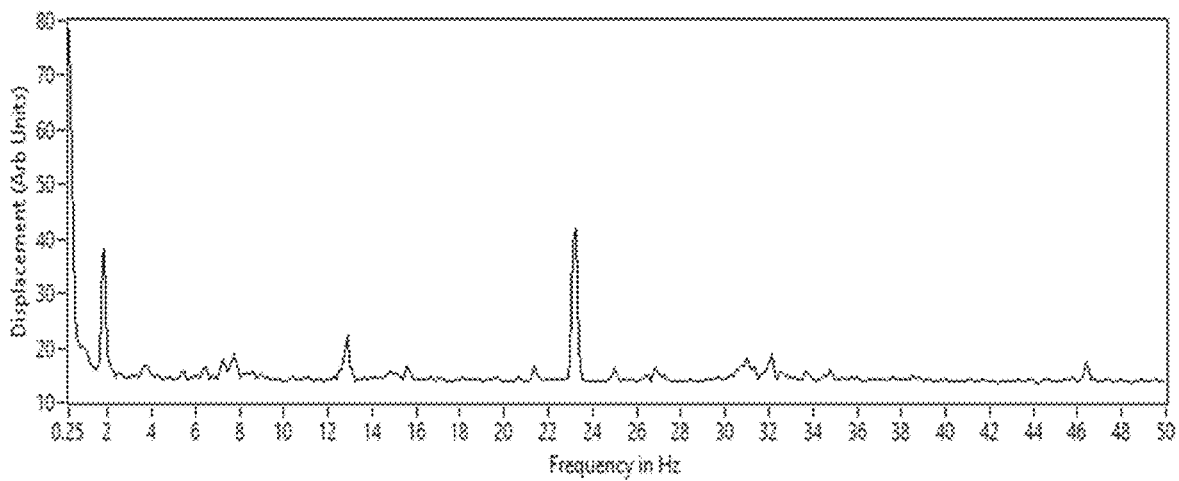
FIG. 10B is a composite frequency spectrum graph constructed from the same video using the linear averaging technique at each frequency in the spectrum from all the pixels in the field of view.

Other methods may be better suited to retain the largest frequency peaks in the data or to retain the large peaks which occur at a specified minimum number of pixels. One alternative is to use a peak hold method where the maximum amplitude value at each frequency location in the spectrum is retained rather than constructing the mean value. This will ensure that the largest frequency peaks in the scene are visible for review regardless of how many pixels share the largest peak frequencies. However, pixels whose spectra are mostly composed of noise rather than meaningful frequencies may still mask smaller peaks in the corresponding pixels. FIG. 10A is a composite frequency spectrum graph constructed using the peak hold technique that captures the largest amplitude value at each frequency in the spectrum from all the pixels in the scene. This can be compared FIG. 10B which is a composite frequency spectrum graph constructed from the same video using the linear averaging technique at each frequency in the spectrum from all the pixels in the scene. Clearly, the composite frequency spectrum graph constructed with peak hold averaging shows frequency peaks that are not present in the composite frequency spectrum graph formed from linear averaging. One such peak has been labeled 81 in FIG. 10A.

Complex scenes such as shown in FIG. 9A often contain many frequencies which are closely spaced. The approach of combining amplitudes from each line in the spectrum by averaging or using some other technique such as peak hold averaging can obscure peaks because a peak in the spectrum may typically involves 3-5 adjacent frequency values. Closely spaced frequency peaks could partially overlay each other. An improved method would focus on the significant peaks in the spectrum only and ignore the data from frequency locations that do not contain peaks or only peaks with insignificant amplitude. These areas typically represent noise and do not contribute significant amplitude to the signal from that pixel. Typically locating the top 15-20 peaks in a spectrum will capture 99% of the total amplitude present in the spectrum. Additionally, a large frequency peak which occurs at only a few pixels is probably not meaningful in the motion in the scene. It is unlikely that a real vibration would only appear spatially in a few pixels, for example 100 pixels or less. Thus, it is important to determine how many pixels exhibit a specific frequency.

Figure 11:
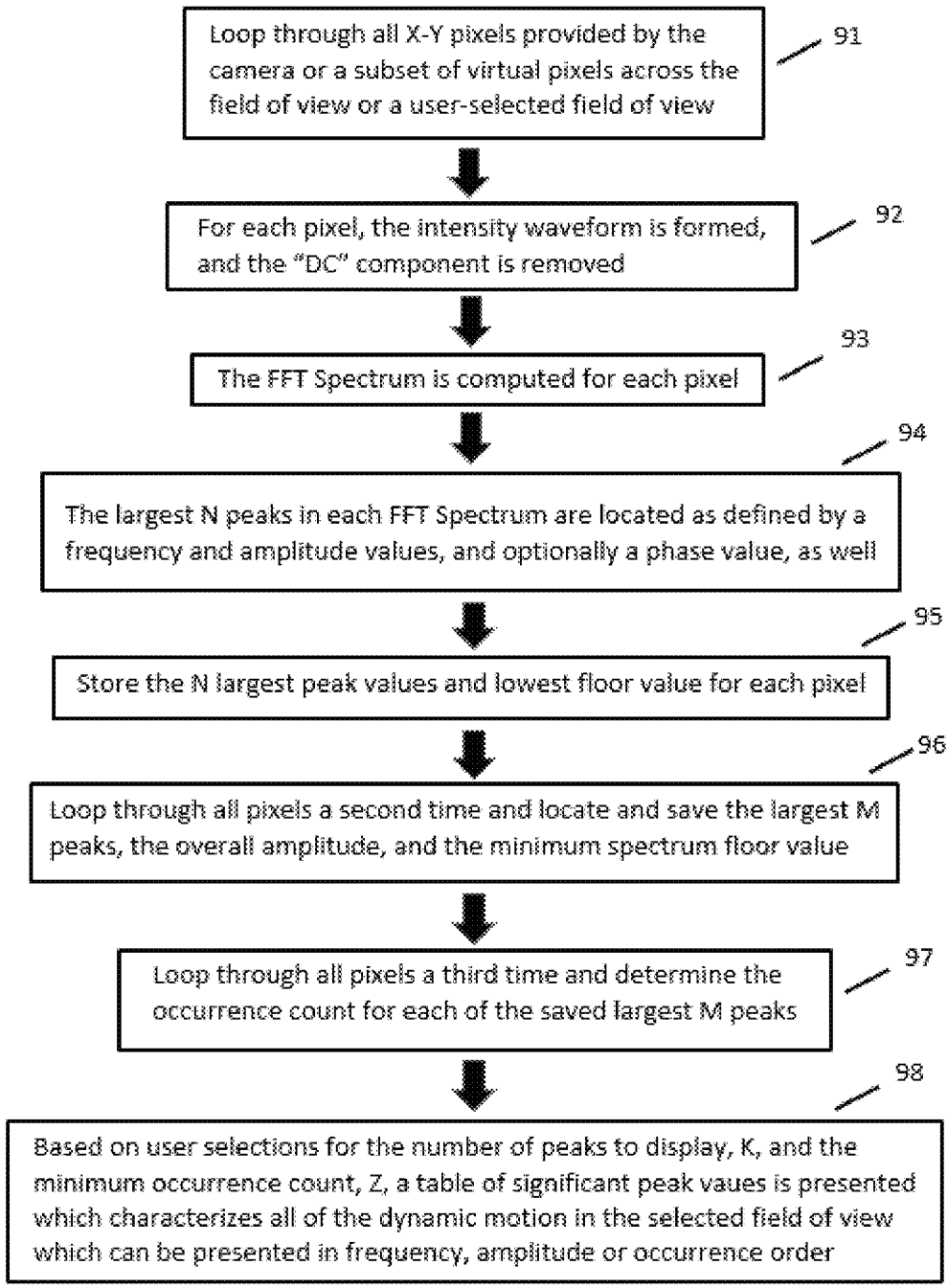
FIG. 11 is a flowchart of how the data in a composite spectrum table is constructed.

Another alternative embodiment would be to locate the largest N frequency peaks for each pixel in the scene. These peak values from each pixel may be combined by applying both amplitude and frequency of occurrence criteria to determine which frequency peaks are retained to reconstruct a single composite frequency spectrum graph or to create an ordered composite frequency spectrum table that could be used to establish the color mapping applied to a single frame or a replay of the video. FIG. 11 is a flowchart of how the data in a composite spectrum table is constructed. The overall amplitude value of each pixel is retained in order to produce a magnitude color map that is not frequency specific.

The lowest value in the spectral data or the average of floor values selected from non-peak locations in the frequency spectra would be chosen as the floor value assign to any frequency line where no peak exists in the data. Peak values would be superimposed over the floor values as a single line or possibly as two or three lines. Peaks, defined by a frequency, amplitude, and phase value, could be determined in any number of logical ways. One approach would be to locate the largest N peaks in the FFT spectrum of each pixel, box 94 in FIG. 11. Prior to doing this, the steps as shown in boxes 91, 92, and 93 of FIG. 11 would be the same as those for steps 21, 22, and 23 discussed with FIG. 2. The frequency and amplitude of the located peak could be defined by the frequency value at the largest amplitude, by applying fitting techniques to the top values forming the peak, or by calculating more accurate values based on the window function applied to the time data before the FFT is calculated, using conventional methods known to those skilled in the art. As desired, at box 95 the N largest peak values and lowest floor value for each pixel are stored in memory. A second pass screening of the N largest peaks for each pixel would locate the largest M peaks in the entire set of the pixels, box 96 in FIG. 11, and a third pass determine the number of pixels exhibiting the same frequency peak for this set of M largest peaks, box 97. The amplitude of an individual peak could be established by calculating the mean of the amplitude values for all the pixels where this frequency occurs or using the maximum value in this set, or some combination of the mean and the maximum value. This creates a table of M rows, with each row containing a frequency value, an amplitude value, and a total pixel count. As the execution of steps according to a flowchart represented by FIG. 2 presented a constructed composite frequency spectrum graph, in FIG. 11 at box 98 a table of significant peaks is presented providing a characterization of all dynamic motion present in the field of view or selected portion, the results of which can be presented in order of frequency, amplitude, or occurrence.

Figure 13:
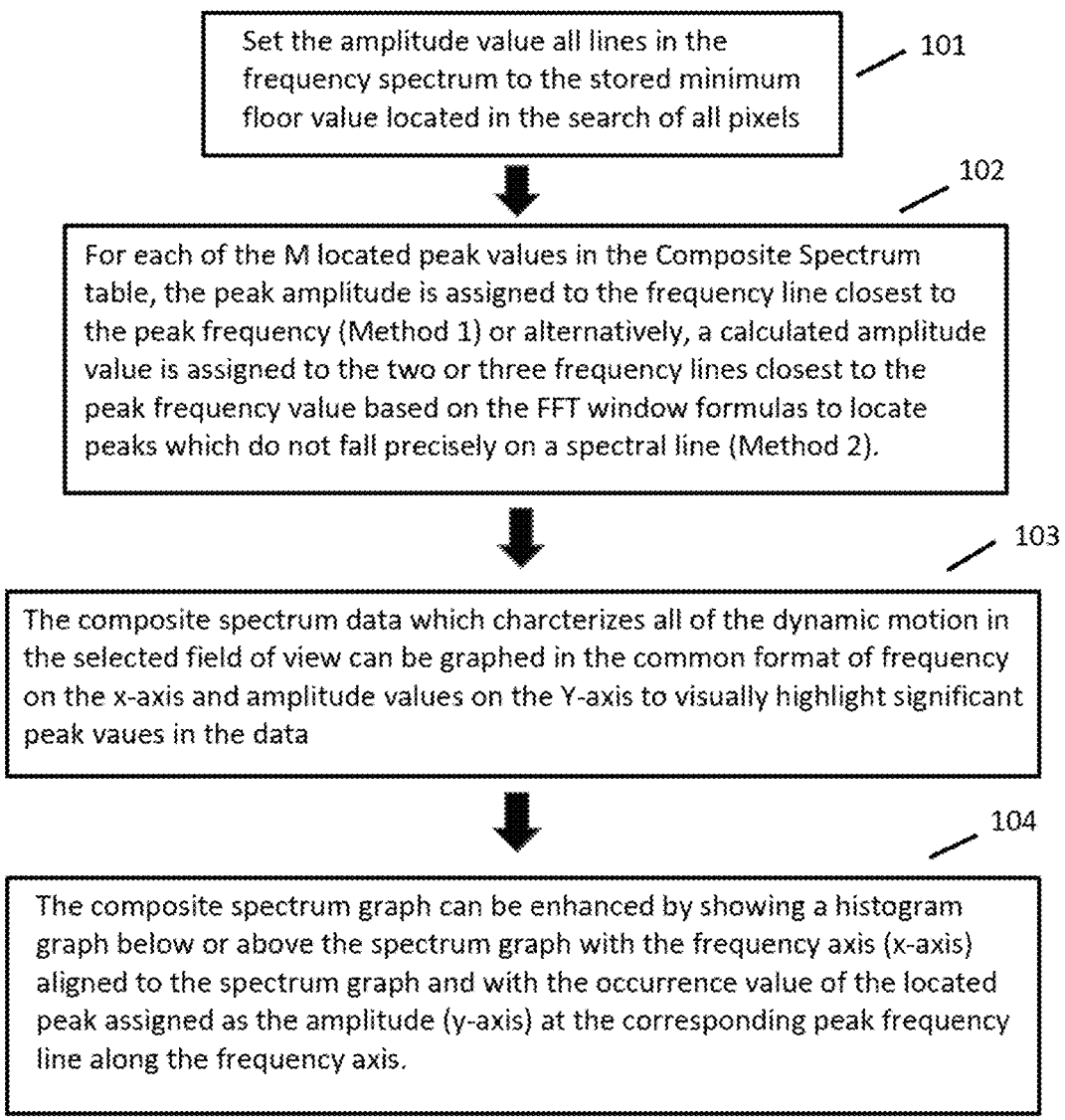
FIG. 13 is a flowchart of how the data in a composite spectrum table is presented in a composite spectrum graph.
Figure 14:
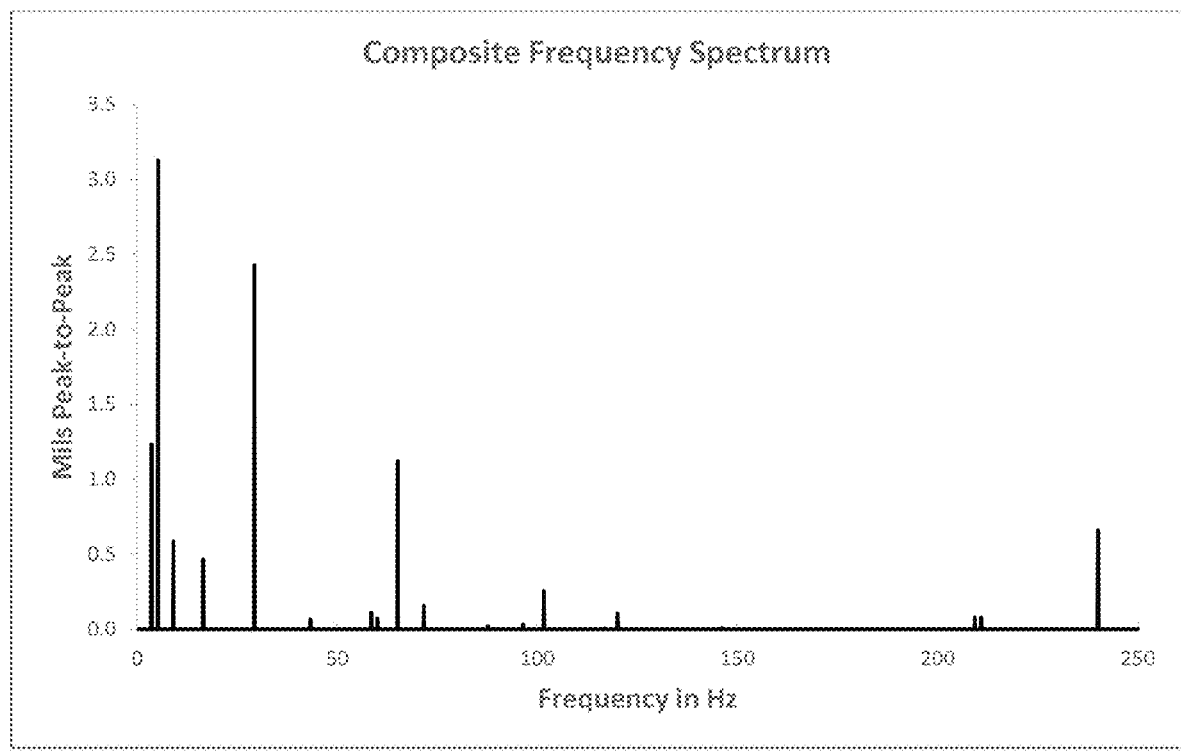
FIG. 14 is a composite frequency spectrum graph formed using the data from the table of the 20 largest peaks values from all the pixels in the field of view.

FIG. 12A is a table of the largest 20 peaks compiled from all pixels in the field of view of the complex arrangement shown in FIG. 9A that have an occurrence count greater than 100 pixels arranged in ascending frequency order. Some additional columns are present to show the rank of the peaks by frequency or amplitude, and to present frequency values in orders as well as Hz. FIG. 12B is a table of the largest 20 peaks compiled from all pixels in the field of view that have an occurrence count greater than 100 pixels arranged in descending amplitude order. FIG. 12C is a table of the largest 20 peaks compiled from all pixels in the field of view that have an occurrence count greater than 100 pixels arranged in descending order of pixel count. All of these forms of the table are useful to the analyst and facilitate his evaluation of what frequencies he should emphasize and in what order he may want to review the data. Through conventional techniques, the table can be rearranged to allow a user to change the presentation by double clicking the column heading to sort by the data in that column. This table is an alternate representation of the same information in the composite frequency spectrum graph and can be used without the graphical composite frequency spectrum graph by double clicking on any row as a method for selecting the frequency to colorize in the video. FIG. 14 is a composite frequency spectrum graph constructed formed using the data from the table of the 20 largest peaks values from all the pixels in the scene. FIG. 13 is a flowchart of how the data in a composite spectrum table is presented in a composite spectrum graph. It should be noted that each frequency peak located in the spectra of the individual pixels also has a phase value associated with it. These phase values could be used to create colorized phase maps for a selected frequency. The phase map at a selected frequency would overlay a selected frame of the video and allow the user to understand phase relationships between objects in the field of view. Phase maps would color pixels with a specified phase relationship or use a color spectrum to identify phase variation from in-phase to out-of-phase. A U.S. patent application which provides exemplary descriptions of a system for evaluating a moving object undergoing periodic motions is Ser. No. 17/217,299, filed Mar. 30, 2021, titled "Apparatus and Method for Visualizing Periodic Motions in Mechanical Components," the contents of which are fully incorporated by reference herein for all purposes. Among other features and capabilities, this application describes a system that calculates and displays phase values for pixels at a selected frequency.

The composite spectrum tables in FIGS. 12A-C contain the occurrence count in pixels, which is not present in the composite frequency spectrum graph. This information could be added to the composite frequency spectrum graph as a histogram graph shown below the frequency axis of the composite frequency spectrum graph as described in step 104 in FIG. 13. For example, in box 101 of FIG. 13 an amplitude value for all lines in the frequency spectra can be stored to the minimum floor value located in the search of all pixels. Then at box 102, for each of the M located peaks in the composite frequency spectrum table, a peak amplitude is assigned to the frequency line closest to the peak frequency. Alternatively, at box 102, the system assigns a calculated amplitude value to some number of the frequency lines (e.g., 2 or 3) closest to the peak frequency value based on the FFT window formulas to locate peaks which do not fall precisely on a spectral line. The composite spectrum data characterizing all dynamic motion present in the field of view or selected portion can be graphed (box 103) in a format of frequency on the x-axis and amplitude on the y-axis to visually highlight significant peak values in the sampled data. An occurrence histogram (box 104), then is one potential tool for characterizing frequencies present in a field of view or portion thereof.

Figure 15A:
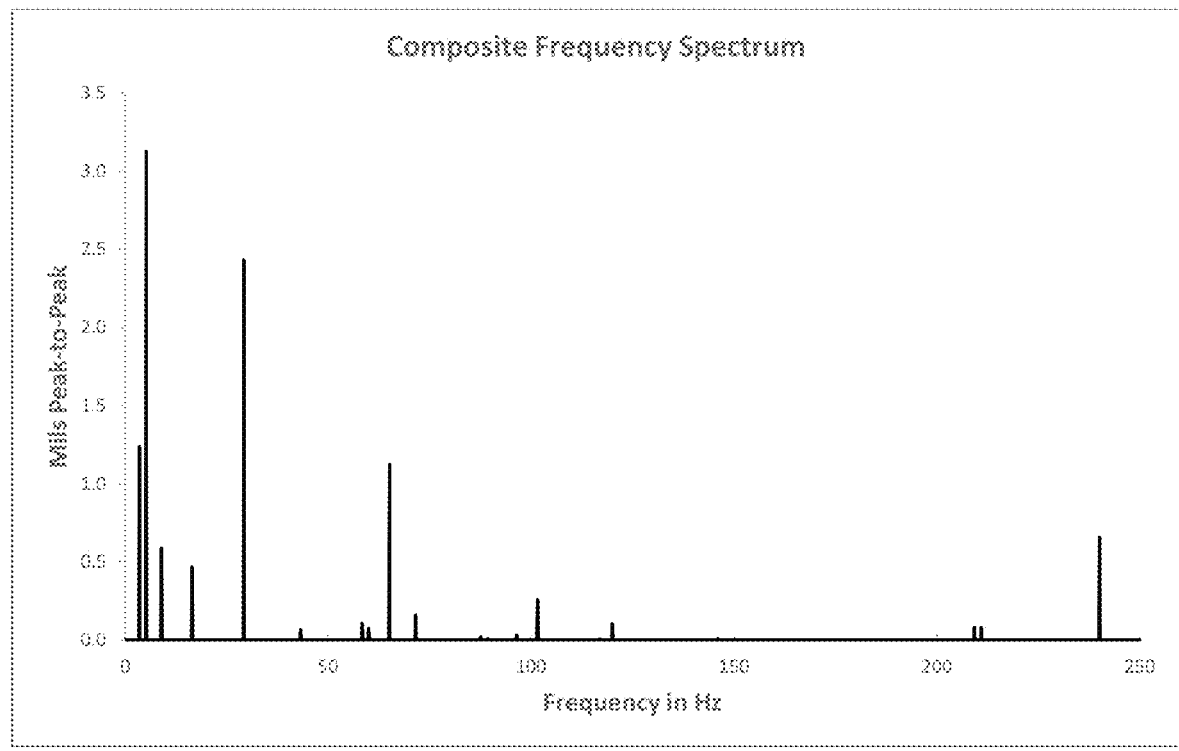
FIG. 15A illustrates a composite frequency spectrum graph and FIG. 15B an occurrence histogram, respectively, constructed from the composite spectrum table in FIGS. 12A-C.
Figure 15B:
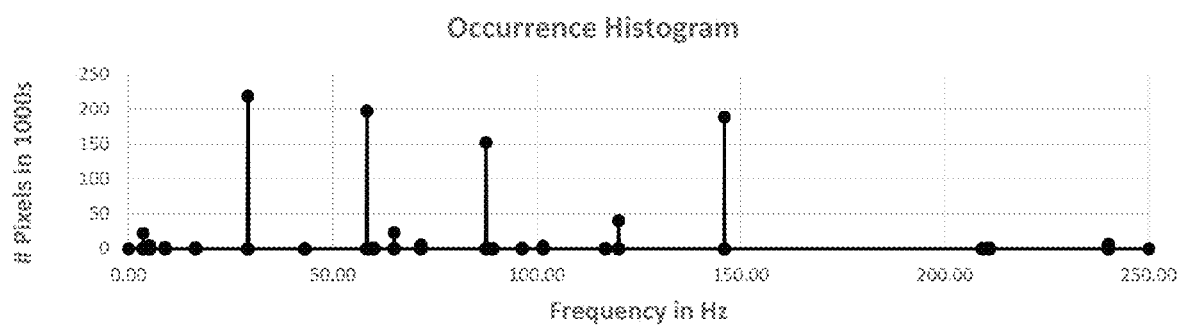

In this regard, FIG. 15B adds an occurrence histogram as complementary information to the composite frequency spectrum graph shown in FIG. 15A, which is a copy of the one shown in FIG. 14. As desired, the composite frequency spectrum graph (FIG. 15A) and occurrence histogram (FIG. 15B) may be displayed together. The data presented in the table or the composite frequency spectrum graph could be customized by the user by controls which allow the user to specify the number of peaks retained and the minimum occurrence count. The discussion of this processing technique has indicated that all pixels in the recorded field of view would be processed; however this technique could be applied to a subset of the pixels in the field of view as selected by the user using a graphical interface to identify pixels to be included or excluded. The interactive graphs or table of peak values combined with colorization of a single frame or the entire video on replay provide a powerful tool for investigating the dynamic information available from millions of pixels enabling the analyst to quickly locate and visualize any motion of interest in the recorded video. Once a frequency value is selected from the graph or the table, then the frequency spectrum or saved peaks associated with each pixel are searched to determine if the frequency is present at this pixel and, if present, its magnitude. This determines the colorization applied to each pixel.

At times, it may be beneficial to eliminate areas within the image for inclusion into the composite frequency spectrum graph. Various reasons for their exclusion could exist but an exemplary list may include but not be limited to: areas known to have no motion, areas of no targeted subject matter such as the floor, the sky or other background, areas with obscuring phenomenon such as steam, or areas saturated by light. These areas may be graphically defined by the user as regions set to include pixels into the composite frequency spectrum graph and regions set to excluded pixels from the composite frequency spectrum graph. These regions may be determined by shapes drawn on the screen to define these regions. These shapes may be color coded or shaded to indicate inclusion or exclusion.

The composite frequency spectrum graph may be limited to specific objects, object types or other limiting subject matter. Image segmentation may be used to narrow the region or pixels to be included within the composite frequency spectrum graph or table. It will be appreciated that image segmentation is a well-known and established technique, which is familiar to persons of ordinary skill in this field. The user may employ image segmentation by selecting an area in the image and the segmentation process includes all areas associated with that segment. For example, the user may click on a pipe and the image segmentation process identifies all areas in the image associated with or a part of that pipe for inclusion. Object recognition may be another way in which the areas in which pixels are included into the composite frequency spectrum graph are limited or narrowed. It will be appreciated that object recognition is a well-known and established technique which is known to persons of ordinary skill in this field. The user may wish to look at only the motor or pump or both. Object recognition may be employed to identify the pixels associated with the motor. The object recognition may identify the object, and the pixels associated with the object and only include that object. Object recognition may also be used to identify an object type, for example, pipes so that all pipes in the scene are included.

The composite frequency spectrum graph or table may also be used to form a set of filtered data videos. From the composite frequency spectrum graph or table, a list of frequencies can be derived, for example like those presented in FIG. 12A-C. The user may select the X frequencies of largest amplitude in the composite frequency spectrum graph, the highest from a peak hold or other set of criteria that are common in selecting peaks of interest. These selected frequencies may be used to create individual videos filtered at those frequencies with color mapping optionally applied to facilitate rapid, prioritized review of the significant frequencies in the original video.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A system for evaluating a moving object undergoing periodic motion using at least one video acquisition device that acquires sampled data in a video recording, the video recording having a plurality of video images of the moving object which are divisible into individual video image frames, and with each frame being divisible into a plurality of pixels, comprising:
   a processor and a memory for storage of the individual video image frames; and
   a computer program operating in said processor,
   wherein the video acquisition device is configured with an adjustable frame rate that allows the video images to be acquired at a sampling rate that is sufficient to capture a plurality of frequencies present in the periodic motion; and
   wherein the computer program operates on a subset of pixels from the plurality of pixels in a field of view of the video recording to create a frequency spectrum for each pixel in the subset of pixels, each frequency in the frequency spectrum having a peak, to construct a composite frequency spectrum presenting one or more selected frequencies from among the plurality of frequencies wherein the selection of frequencies is based on predetermined criteria, and to store a phase value for each peak associated with each pixel in the subset of pixels.

* * * * *